(12) United States Patent
Narita et al.

(10) Patent No.: US 6,184,971 B1
(45) Date of Patent: Feb. 6, 2001

(54) EXPOSURE APPARATUS AND IMAGE FORMATION APPARATUS

(75) Inventors: Izumi Narita, Shizuoka-ken; Kenji Muto, Mishima, both of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/157,492

(22) Filed: Sep. 21, 1998

(30) Foreign Application Priority Data

Sep. 26, 1997 (JP) .................................................. 9-278010
Dec. 15, 1997 (JP) .................................................. 9-345448
Sep. 9, 1998 (JP) ................................................ 10-255140

(51) Int. Cl.[7] .............................. G03B 27/54; B41J 2/45; G03G 15/00
(52) U.S. Cl. .............................. 355/67; 355/35; 355/41; 355/47; 347/238; 399/4; 399/32; 399/51
(58) Field of Search ................................. 355/35, 41, 47, 355/67; 347/238; 399/4, 32, 51, 70, 171

(56) References Cited

U.S. PATENT DOCUMENTS

| | | | |
|---|---|---|---|
| 5,255,013 | * 10/1993 | Ng et al. .............................. | 346/107 |
| 5,258,629 | * 11/1993 | Itoh et al. ............................. | 257/88 |
| 5,745,152 | * 4/1998 | Vincent et al. ...................... | 347/238 |
| 5,809,216 | * 9/1998 | Ng ....................................... | 395/109 |
| 5,917,535 | * 6/1999 | Corona ................................ | 347/238 |
| 5,940,113 | * 8/1999 | Wilson ................................ | 347/238 |
| 6,002,420 | * 12/1999 | Tanioka et al. ..................... | 347/237 |
| 6,014,202 | * 1/2000 | Chapnik ............................... | 355/67 |

\* cited by examiner

Primary Examiner—Russell Adams
Assistant Examiner—Khaled Brown
(74) Attorney, Agent, or Firm—Fitzpatrick, Cella, Harper & Scinto

(57) ABSTRACT

A high-quality image is formed by using light emission element arrays of plural lines. The plural light emission element arrays are arranged substantially in parallel, an area of a light emission part of each array being different from others, respective light emission elements in the light emission element arrays are caused to selectively perform light emission according to gradation data, and the respective light emission element arrays overlappingly perform exposure on a relatively moved photosensitive body.

13 Claims, 31 Drawing Sheets

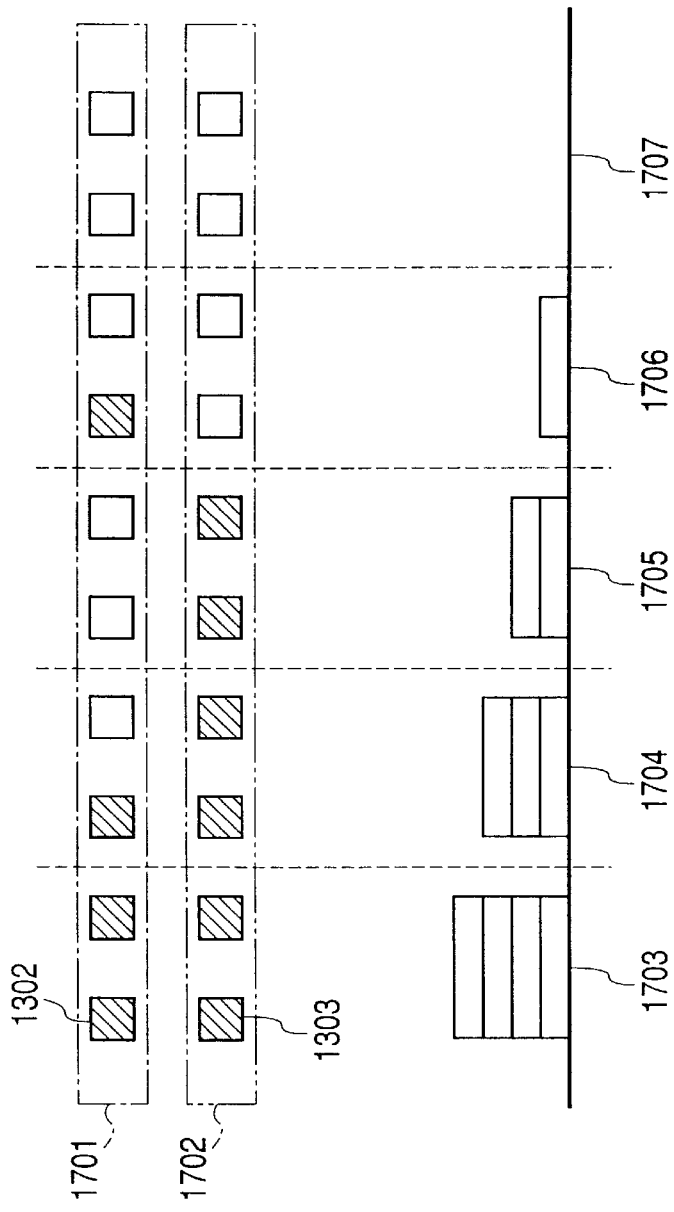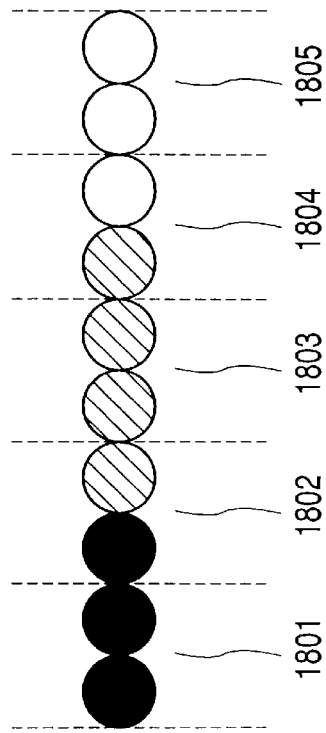
FIG. 17
FIG. 18

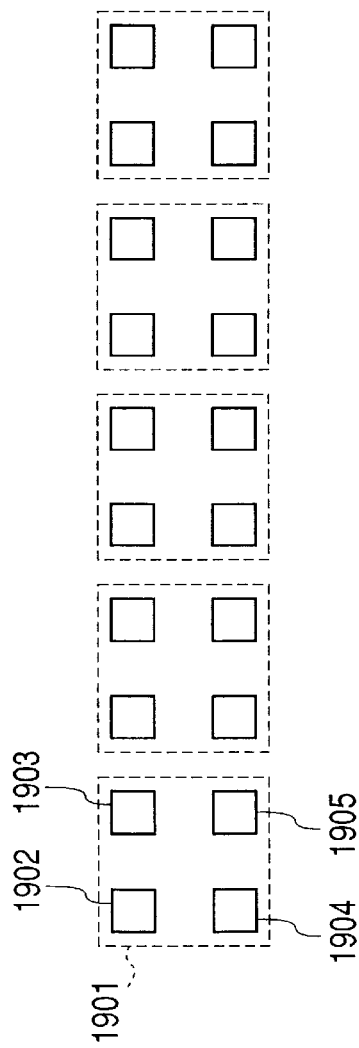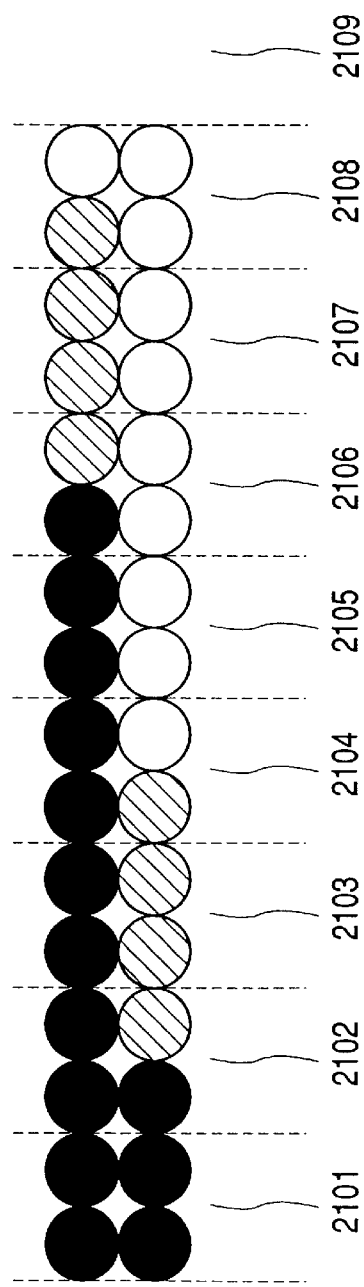

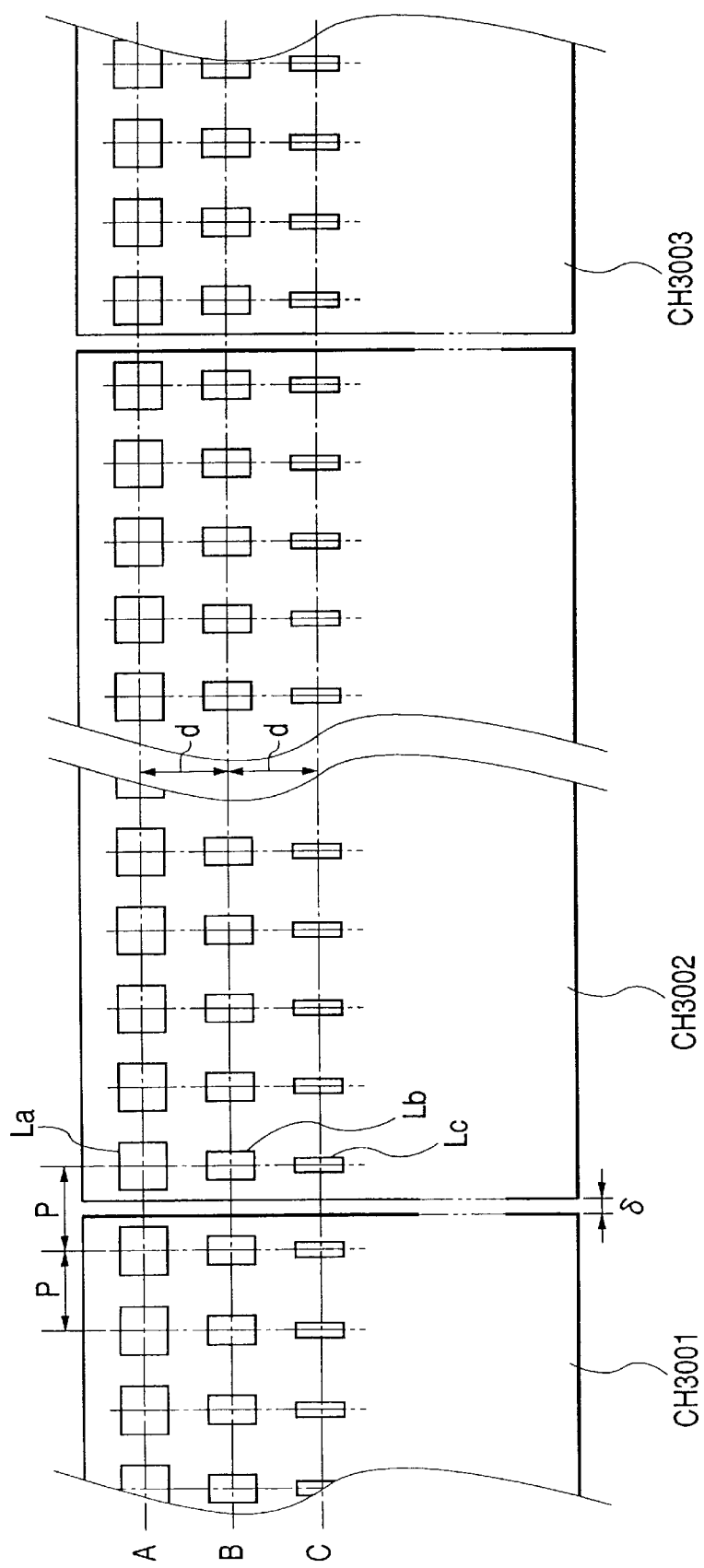

EXPOSURE APPARATUS AND IMAGE FORMATION APPARATUS

BACKGROUND OF THE INVENTION

1. Field of the Invention

The present invention relates to an exposure apparatus which exposes a photosensitive body such as a photosensitive drum, a photosensitive belt or the like by using a light emitter array, and more particularly to an exposure apparatus which is used as a writing system in an image formation apparatus of an electrophotographic system.

2. Related Background Art

Conventionally, an exposure apparatus which forms a pattern on a photosensitive drum by using a light emitter array having plural light emission areas has been well known.

However, in a case where the light emitter array, e.g., an LED (light emission diode) array, is used as an exposure part in an image formation apparatus of an electrophotographic system, it is difficult to cause the array to expose the drum by independently controlling a light emission amount of each light emission element provided in the array. Therefore, there has been a problem that it is difficult to represent a gradation (or tonal) image such as an image of nature or the like.

SUMMARY OF THE INVENTION

The present invention has been made in consideration of such a problem in the above conventional technique, and an object thereof is to provide an exposure apparatus which can represent necessary gradation or tonality, obtain a multi-value and multigradation (i.e., multiple gradation) image and also contribute to miniaturization of an image formation apparatus itself.

An exposure apparatus according to the present invention is characterized in that:

plural light emission element arrays are arranged substantially in parallel, where an area of a light emission part of each array is different from others, and respective light emission elements in the light emission element arrays are caused to selectively perform light emission according to gradation data, so that the respective light emission element arrays overlappingly perform exposure on a photosensitive body.

Further, an image formation apparatus according to the present invention is characterized in that:

plural light emission element arrays are arranged substantially in parallel, where an area of a light emission part of each array is different from others, and respective light emission elements in the light emission element arrays are caused to selectively perform light emission according to gradation data, so that the respective light emission element arrays overlappingly perform exposure on a photosensitive body to form a gradation image on that body.

Further, an exposure apparatus according to the present invention comprises:

plural switch elements which are arranged in array and sequentially turned on; and light emission element arrays of plural lines in which light emission elements respectively connected to the plural switch elements are arranged in array, and which are arranged substantially in parallel, and wherein, when the light emission elements are turned on by the corresponding switch elements, the plural light emission elements are scanned, and the respective light emission elements are caused to selectively perform light emission according to gradation data, and thus the respective light emission element arrays overlappingly perform exposure on a photosensitive body.

An image formation apparatus according to the present invention comprises:

plural switch elements which are arranged in array and sequentially turned on; and light emission element arrays of plural lines in which light emission elements respectively connected to the plural switch elements are arranged in array, and which are arranged substantially in parallel, and wherein, when the light emission elements are turned on by the corresponding switch elements, the plural light emission elements are scanned, and when the respective light emission elements are caused to selectively perform light emission according to gradation data and thus the respective light emission element arrays overlappingly perform exposure on a photosensitive body, a gradation (or tonal) image is formed on the photosensitive body.

An exposure apparatus according to the present invention comprises:

plural switch elements which are arranged in array and sequentially turned on; and light emission element arrays of plural lines in which light emission elements respectively connected to the plural switch elements are arranged in array, and which are arranged substantially in parallel, and wherein, when the light emission elements are turned on by the corresponding switch elements, the plural light emission elements are scanned, and an exposure amount (or value) is different for each light emission element array.

An image formation apparatus according to the present invention comprises:

plural switch elements which are arranged in array and sequentially turned on; and light emission element arrays of plural lines in which light emission elements respectively connected to the plural switch elements are arranged in array, and which are arranged substantially in parallel, and wherein, when the light emission elements are turned on by the corresponding switch elements and thus the plural light emission elements are scanned, an image is formed on a photosensitive body, and an exposure amount is different for each light emission element array.

Other objects, structures and effects of the present invention will become apparent from the following detailed description and the accompanying drawings.

BRIEF DESCRIPTION OF THE DRAWINGS

FIG. 17 is a view showing lighting of an LED array according to the fourth embodiment of the present invention;

FIG. 18 is a view showing a print result according to the fourth embodiment of the present invention;

FIG. 19 is a view showing a state that exposure is performed on a photosensitive drum, according to a fifth embodiment of the present invention;

FIG. 21 is a view showing a print result according to the fifth embodiment of the present invention;

FIG. 43 is a schematic view showing a part of a light emission element chip array according to a tenth embodiment of the present invention.

DETAILED DESCRIPTION OF THE PREFERRED EMBODIMENTS

Hereinafter, preferred embodiments of the present invention will be explained with reference to the accompanying drawings.

(First Embodiment)

Figure 1:
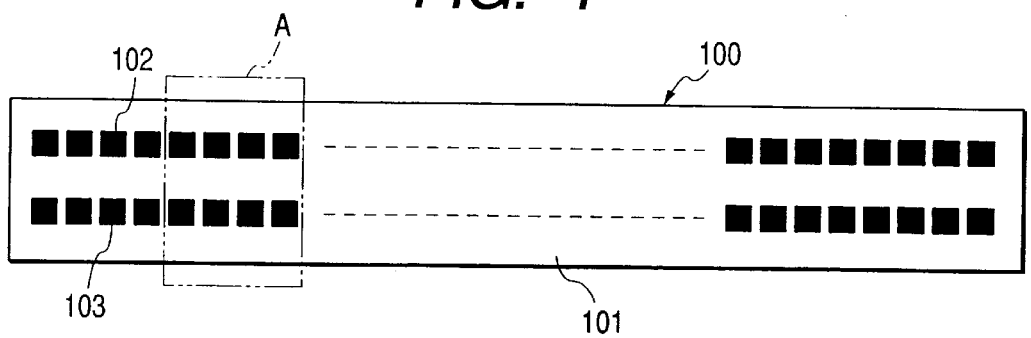
FIG. 1 is a view showing a schematic structure of an exposure apparatus according to a first embodiment of the present invention.
Figure 2:
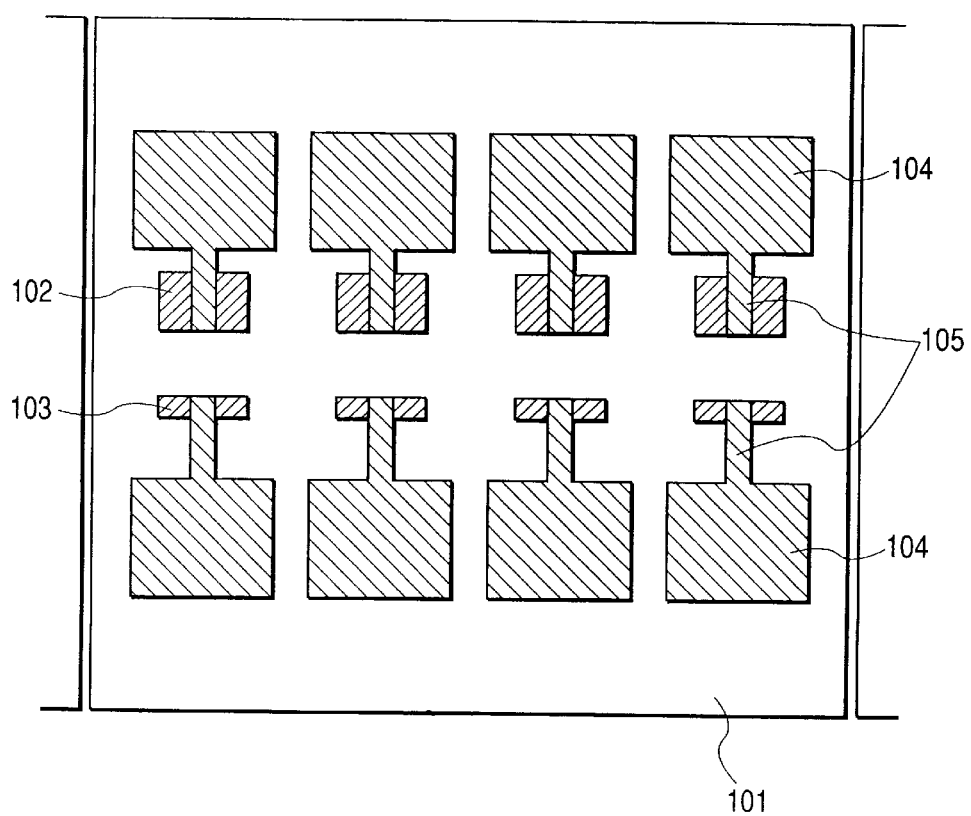
FIG. 2 is a view showing a schematic structure of an LED array in the exposure apparatus according to the first embodiment of the present invention.
Figure 3:
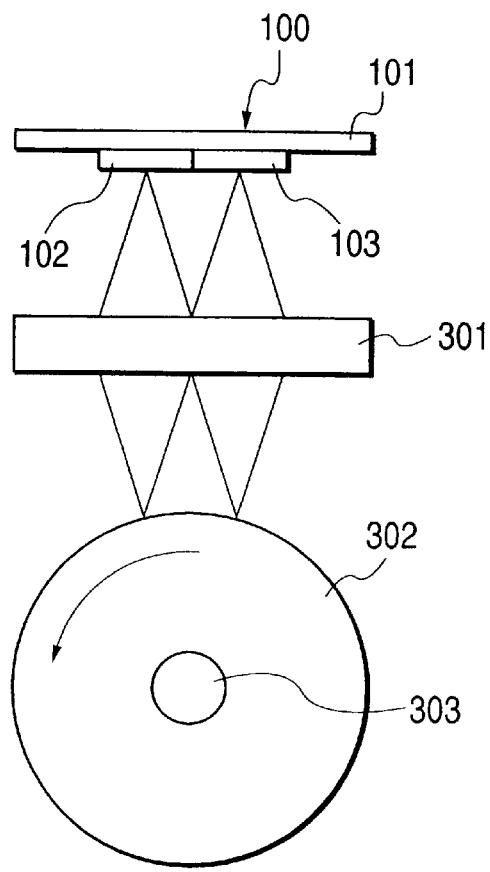
FIG. 3 is a block diagram showing a main-part structure of an image formation apparatus having the exposure apparatus according to the first embodiment of the present invention.
Figure 4:
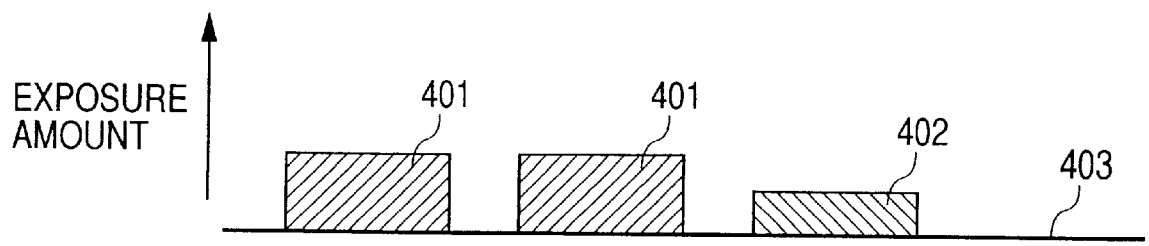
FIG. 4 is a view showing a state that exposure is performed on a photosensitive drum by the exposure apparatus according to the first embodiment of the present invention.

Initially, the first embodiment of the present invention will be explained with reference to FIGS. 1 to 6. FIG. 1 is the view showing a schematic structure of a light emission diode (LED) array acting as a light emitter array in an exposure apparatus according to the first embodiment of the present invention. FIG. 2 is the enlarged view of an A portion shown in FIG. 1. FIG. 3 is the side view showing a main-part structure in an image formation apparatus of an electrophotographic system using the exposure apparatus. FIG. 4 is a view showing a state wherein a photosensitive drum is exposed by the LED array in the exposure apparatus. FIG.

Figure 6:
FIG. 6 is a view showing a print result obtained when the exposure is performed by the exposure apparatus according to the first embodiment of the present invention.

5 is a view showing a lighting state of the LED array in the exposure apparatus. FIG. 6 is a view showing a print result obtained when the exposure is performed by the exposure apparatus and then image formation is performed.

In FIG. 1, numeral 100 denotes an exposure apparatus. In the apparatus 100, light emission diode (LED) arrays 102 and 103 which act as light emitter arrays moved relative to a later-described photosensitive drum are arranged on a substrate 101, such that plural parallel lines each containing plural arrays are arranged substantially perpendicular to direction of relative movement of the photosensitive drum.

As shown in FIG. 2, pads 104 corresponding to the LED arrays 102 and 103 are respectively connected to upper electrodes 105. As shown in the drawing, an area of a light emission part of the LED array 102 in one line is set to be larger than that of the LED array 103 in the other line.

In FIG. 3, numeral 100 denotes the exposure apparatus, numeral 101 denotes the substrate, numerals 102 and 103 denote the LED arrays, numeral 301 denotes a rod lens array, and numeral 302 denotes a photosensitive drum. The drum 302 is rotated counterclockwise (direction indicated by arrow) around its central axis 303. In the drawing, light emitted or produced from the light emission parts of the LED arrays 102 and 103 in the exposure apparatus 100 is exposed on the photosensitive drum 302 through the rod lens array 301, and then visualized in a known process according to an electrophotographic system.

In FIG. 4, numeral 401 denotes parts exposed by the LED array 102, numeral 402 denotes a part exposed by the LED array 103, and numeral 403 denotes a part not exposed.

Figure 5:
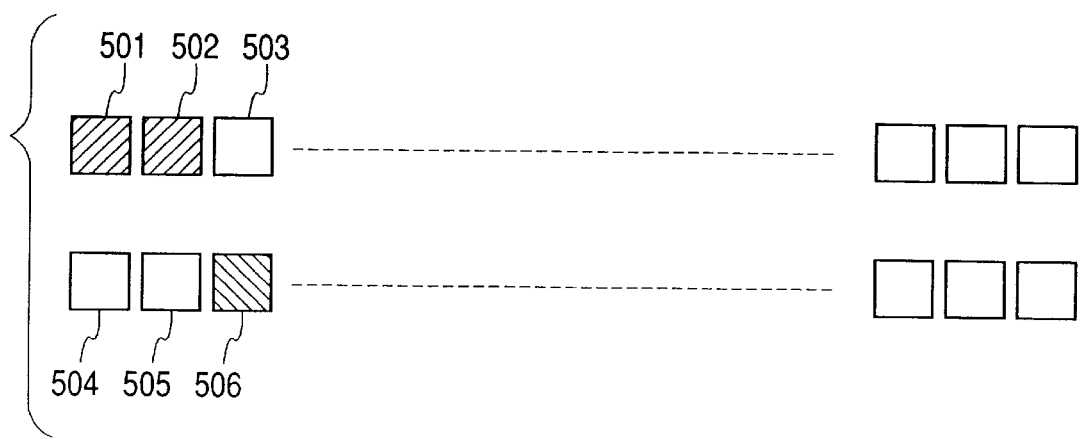
FIG. 5 is a view showing a lighting state of the LED array in the exposure apparatus according to the first embodiment of the present invention.

In FIG. 5, numerals 501, 502 and 506 denote light emission points, and numerals 503, 504 and 505 denote light nonemission points.

In FIG. 6, numerals 601 and 602 denote parts darkly printed, numeral 603 denotes a part lightly printed, and numeral 604 denotes a part not printed.

Subsequently, an operation of the exposure apparatus 100 structured as above will be explained with reference to FIGS. 1 to 6.

For example, in the case where the parts 401 are darkly printed, the part 402 is lightly printed and the part 403 is not printed as shown in FIG. 4, i.e., in a case where it intends to obtain the print result as shown in FIG. 6, if the parts 501 and 502 are exposed on the LED array 102 side, and after elapsing a predetermined time, the part 506 is exposed on the LED array 103 side as shown in FIG. 5, then the printing can be performed at necessary gradation. Thus, the exposed photosensitive drum 302 is then subjected to the ordinary process (not shown) according to the electrophotographic system, and a toner corresponding to an obtained image is transferred and fixed onto a copy paper. Then, a series of operations terminates.

As explained above, in the exposure apparatus 100 according to the present embodiment, the plural lines of the LED arrays 102 and 103 are arranged, and the area of the light emission part of the LED array 102 in one line is set to be larger than that of the LED array 103 in the other line. Thus, the exposure apparatus 100 causes the respective LED arrays 102 and 103 to selectively perform light emission to expose the identical line in a main-scanning direction. As a result, the print result of the necessary gradation can be obtained even by using the light emission element array.

In the present embodiment, a case was explained where the LED arrays 102 and 103, in which the area of the light emission part is made, vary for every plural lines in a sub-scanning direction. However, the present invention is not limited to such a case. That is, even if light emission amounts of the LED arrays 102 and 103 are changed by making the area of the light emission part vary for every plural lines in the main-scanning direction or changing shapes of the arrays 102 and 103, it is apparent to be able to derive such an effect as described above.

Further, the photosensitive body is not limited to the photosensitive drum. That is, a photosensitive belt may be used as the photosensitive body.

(Second Embodiment)

Subsequently, the second embodiment of the present invention will be explained with reference to FIGS. 7 to 9. Since a structure of an LED array in an exposure apparatus according to the present embodiment is the same as that shown in FIGS. 1 to 3 in the above first embodiment, the LED array will be explained also by utilizing FIGS. 1 to 3.

Figure 7:
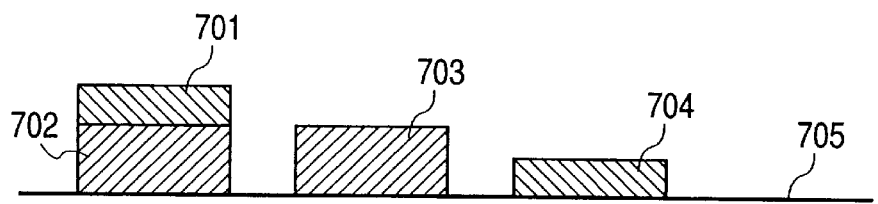
FIG. 7 is a view showing a state that exposure is performed on a photosensitive drum by an exposure apparatus according to a second embodiment of the present invention.

FIG. 7 is a view showing a state wherein a photosensitive drum is exposed by the exposure apparatus according to the second embodiment of the present invention. FIG. 8 is a view showing a lighting state of a light emission part of the LED array in the exposure apparatus. FIG. 9 is a view showing a print result obtained when the exposure is performed by the exposure apparatus and then image formation is performed.

In FIG. 7, numerals 702 and 703 denote parts exposed by the LED array 102, numerals 701 and 704 denote parts exposed by the LED array 103, and numeral 705 denotes an unexposed part not exposed by any LED array.

Figure 8:
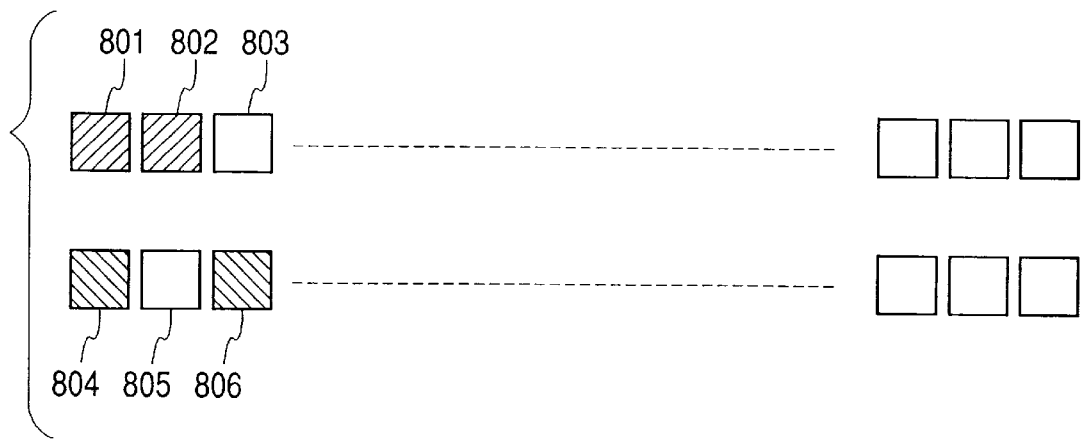
FIG. 8 is a view showing a lighting state of an LED array in the exposure apparatus according to the second embodiment of the present invention.

In FIG. 8, numerals 801, 802, 804 and 806 denote light emission points, and numerals 803 and 805 denote light nonemission points.

Figure 9:
FIG. 9 is a view showing a print result obtained when the exposure is performed by the exposure apparatus according to the second embodiment of the present invention.

In FIG. 9, numeral 901 denotes a part most darkly printed, numeral 902 denotes a part second darkly printed, numeral 903 denotes a part lightly printed, and numeral 904 denotes a part not printed.

Subsequently, an operation of the exposure apparatus structured as above will be explained with reference to FIGS. 1 to 3 and 7 to 9.

For example, in the case where the part 901 is most darkly printed, the part 902 is second darkly printed, the part 903 is lightly printed and the part 904 is not printed, as shown in FIG. 9, the identical part already exposed by the light emission point 801 is multiexposed (i.e., multiple-exposed) by the light emission point 804 in the other line to form the part 901 as shown in FIG. 8. Further, the part is exposed only by the light emission point 802 to form the part 902, and the part is exposed only by the light emission point 806 to form the part 903. In the above case, when the part is exposed by both-line light emission points, exposure timing is controlled based on aberration of a predetermined time according to rotational speed of the photosensitive drum. That is, the exposure capable of representing necessary gradation can be realized by selecting one of two selectable methods, in one method the identical part on the photosensitive drum 302 is exposed by the light emission points in both lines in the exposure apparatus 100 containing the LED arrays of the plural lines, and in the other method the drum 302 is exposed by either one of the two light emission points. Subsequently, the exposed photosensitive drum 302 is then subjected to an ordinary process (not shown) according to an electrophotographic system, and a toner corresponding to an obtained image is transferred and fixed onto a copy paper. Then, a series of operations terminates.

As explained above, in the exposure apparatus 100 according to the present embodiment, the LED arrays 102 and 103 of the plural lines are arranged, and the LED arrays 102 and 103 are selectively caused to perform light emission in one of the selectable methods, i.e., one to perform the multiexposure (multiple exposure) on the identical part on the drum 302, and the other to perform the exposure by using either one or both of the arrays. Thus, by overlappingly exposing the identical main-scanning line, the print result of the necessary gradation can be obtained without any complicated control process even if an exposure apparatus using the light emission element array is used.

In the present embodiment, a case was explained case, where the LED arrays 102 and 103, in which the area of the light emission part is made, vary for every plural lines in a sub-scanning direction. However, the present invention is not limited to such a case. That is, even if light emission amounts of the LED arrays 102 and 103 are changed by making the area of the light emission part vary for every plural lines in a main-scanning direction or changing shapes of the arrays 102 and 103, it is apparent to be able to derive such an effect as described above.

(Third Embodiment)

Subsequently, the third embodiment of the present invention will be explained with reference to FIGS. 10 to 12. In an exposure apparatus according to the present embodiment, a self-scanning type light emitter chip having a thyristor structure is used.

Figure 10:
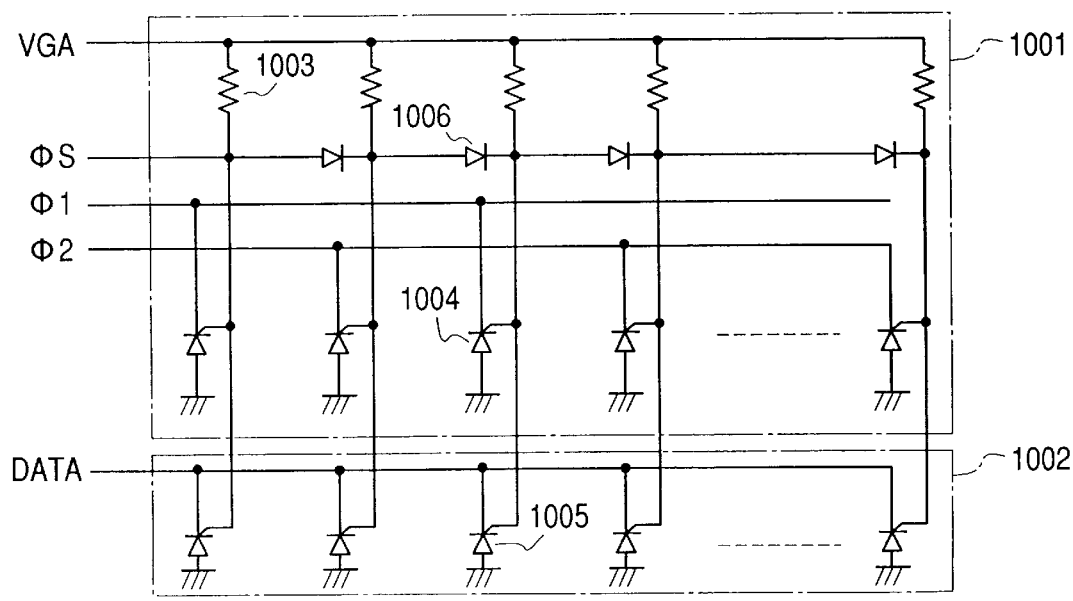
FIG. 10 is a view showing an equivalent circuit of a self-scanning type light emitter chip in an exposure apparatus according to a third embodiment of the present invention.

FIG. 10 is a block diagram showing a structure of an equivalent circuit of the self-scanning type light emitter chip in the exposure apparatus according to the third embodiment. FIGS. 11 and 12 are the block diagrams showing a structure of a control unit of a light emission element array 1002 in the exposure apparatus.

In FIG. 10, numeral 1001 denotes a shift register, numeral 1002 denotes the light emission element array, numeral 1003 denotes a load resistor, numeral 1004 denotes a thyristor acting as a switching element, and numeral 1005 denotes a thyristor acting as a light emission element. In this case, it should be noted that the plural thyristors 1004 and 1005 are respectively arranged in array. Gate terminals of the thyristors 1004 and 1005 are connected to each other through a diode 1006, and also are connected to a power supply VGA through the load resistor 1003.

In FIG. 10, transfer clocks $\phi 1$ and $\phi 2$ for a transfer operation are applied to cathodes of the thyristors. If it is assumed that the thyristor 1004 is currently in an ON state based on the transfer clock $\phi 1$, its gate potential is substantially "0" volt. This potential has influence rightward through the diode 1006. Then, since only the rightward elements are selectively turned on in response to the next clock $\phi 2$, it becomes possible to transfer the data rightward. By applying a clock DATA corresponding to image information at the same time as addressing is performed in the above manner, the thyristor 1005 performs light emission.

Then, by repeating the above operation, it is possible to cause the predetermined thyristors 1004 and 1005 to perform light emission according to the image data.

Figure 11:
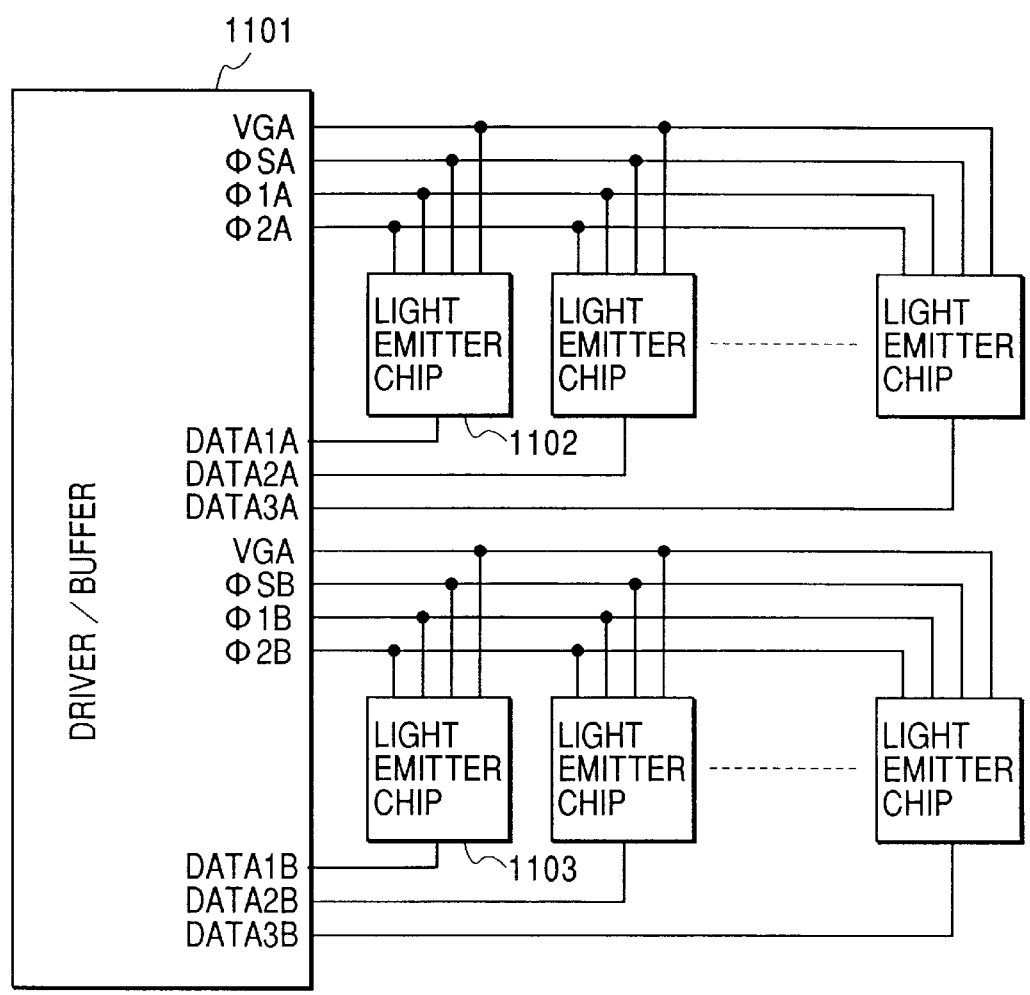
FIG. 11 is a block diagram showing a structure of a control unit of a light emitter array in the exposure apparatus according to the third embodiment of the present invention.

In FIG. 11, numeral 1101 denotes a driver/buffer for the light emission element array 1002 (FIG. 10), and numerals 1102 and 1103 respectively denote self-scanning type light emitter chips in the light emission element array 1002. In this case, the light emitter chips 1102 and 1103 of plural lines are arranged.

Figure 12:
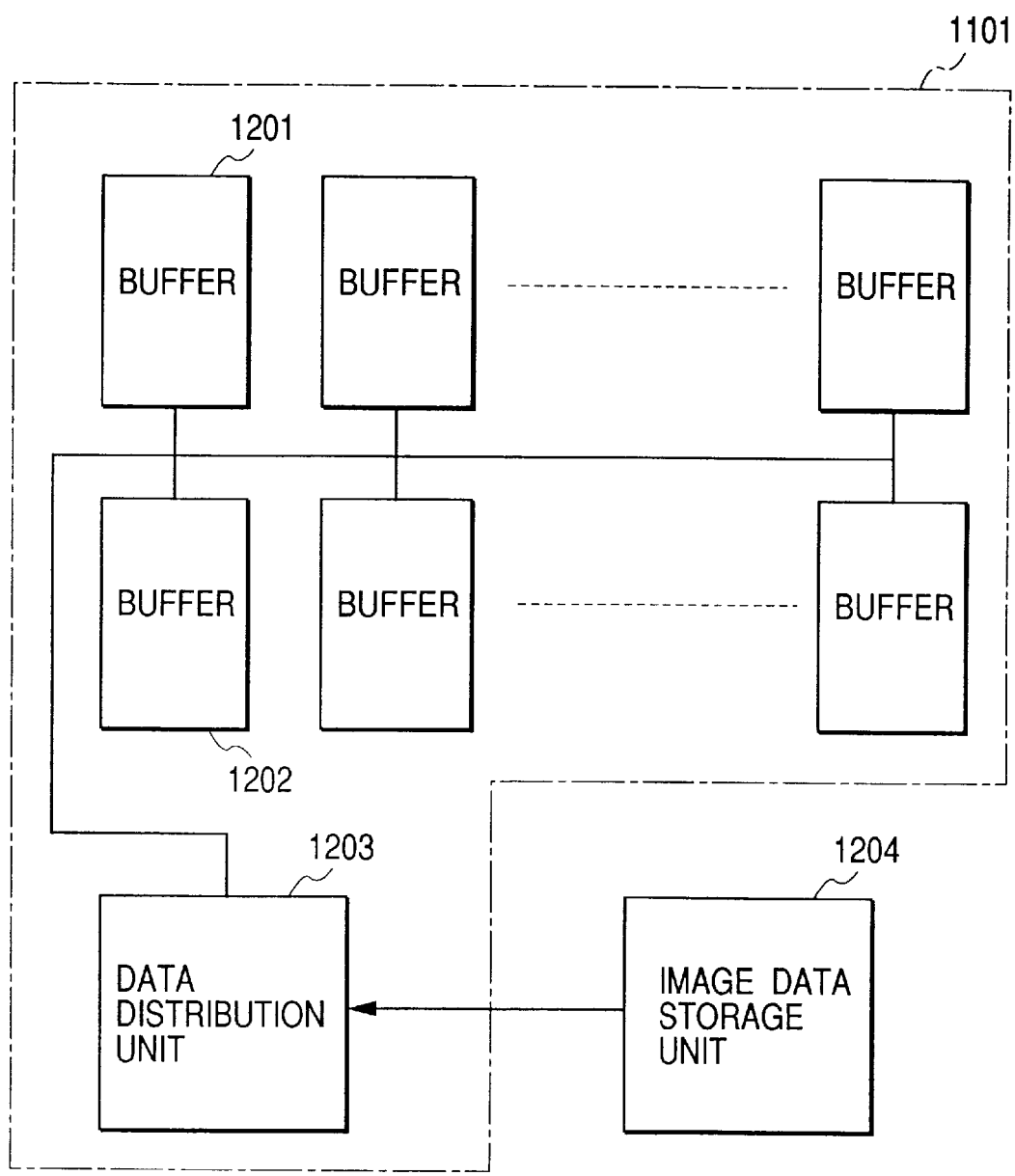
FIG. 12 is a block diagram showing a structure of the control unit of the light emitter array in the exposure apparatus according to the third embodiment of the present invention.

In FIG. 12, numerals 1201 and 1202 denote buffers (to be referred as light emitter chip buffer hereinafter) respectively corresponding to the light emitter chips 1102 and 1103, numeral 1203 denotes a data distribution unit, and numeral 1204 denotes an image data storage unit. The image data stored in the storage unit 1204 is distributed to the predetermined light emitter chip buffers 1201 and 1202 by the distribution unit 1203. Then, based on the distributed data, a light emitter in each of the chips 1102 and 1103 performs an exposure operation.

By arranging the plural light emitter chips 1102 and 1103 in a main-scanning direction, the same light emission element arrays as the LED arrays 102 and 103 in the first and second embodiments can be realized. In such a case where plural self-scanning type light emission element arrays are provided, scanning functions of the respective arrays can be made common. This will be explained in detail in an eighth embodiment.

As explained above, in the exposure apparatus according to the present embodiment, by the light emission element array 1002 using the self-scanning type light emitter chips 1102 and 1103 having the thyristor structure, a compact, low-cost and higher-density exposure apparatus can be realized as compared with a light emission element of a type using an LED chip. Moreover, an image capable of representing necessary gradation can be output.

As explained above, the exposure apparatus according to the present invention can represent the necessary gradation by using the light emission element array and can be made compact in size as compared with an exposure apparatus of a laser system. Moreover, by applying the above exposure apparatus to an image formation apparatus of an electrophotographic system capable of outputting a color image, a multivalue and multigradation image can be obtained. Moreover, by using the exposure apparatus of a so-called light emission point transfer type in which the plural light emission points in the light emission element chip are sequentially transferred, it becomes unnecessary to perform one-to-one wiring between the light emission element and a pixel. Therefore, since the amount of wire bonding for applying a current to cause the light emission elements to perform light emission can be remarkably reduced even if the pixels each corresponding to one light emission element are made highly dense, the image formation apparatus can be further made compact in size.

(Fourth Embodiment)

The present embodiment will be explained with reference to FIGS. 13 to 15 and 30 to 33.

Figure 13:
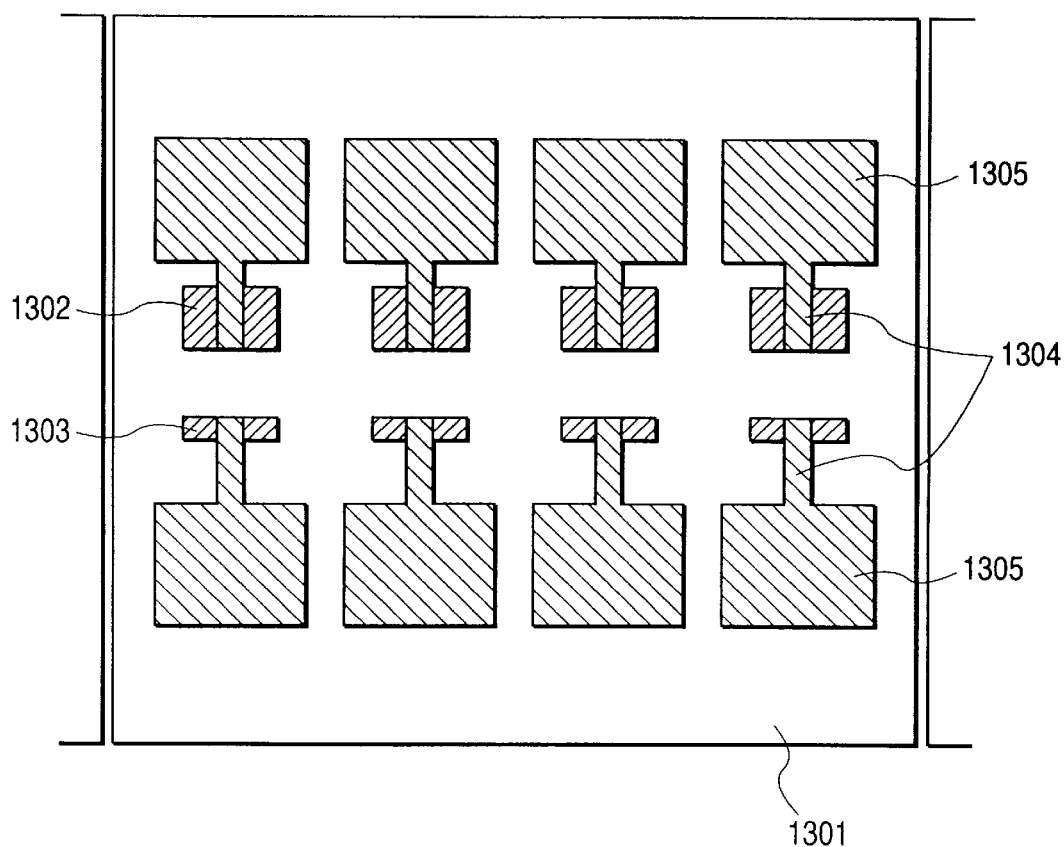
FIG. 13 is a conceptional view showing an LED chip according to the present invention.
Figure 14:
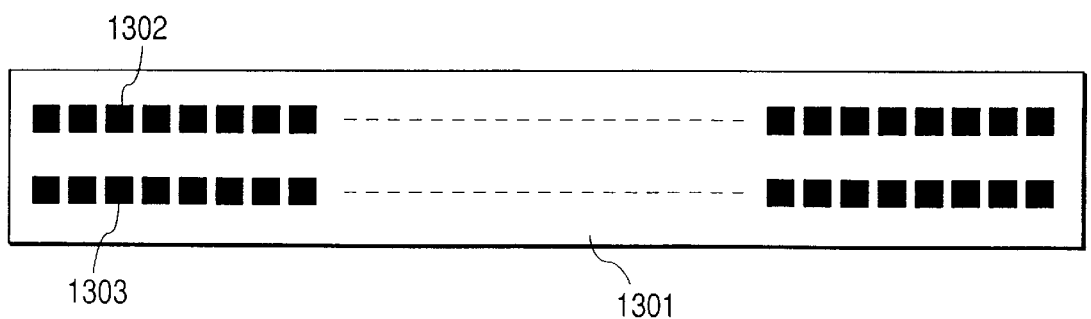
FIG. 14 is a conceptional view showing an LED array according to the present invention.
Figure 15:
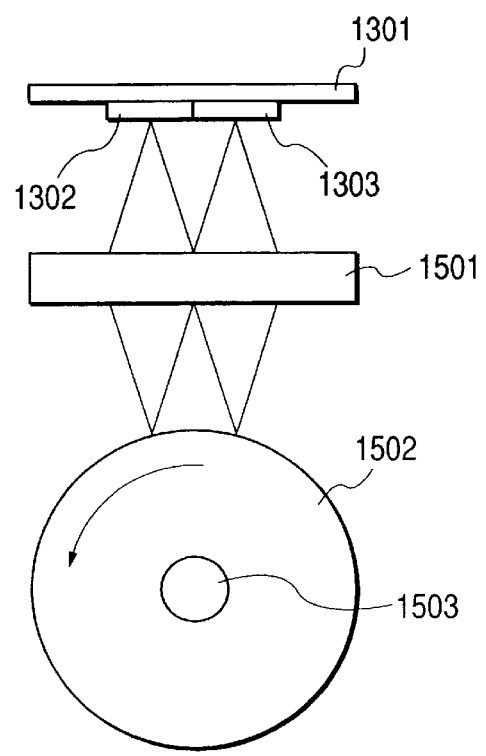
FIG. 15 is a view showing a main part of an image formation apparatus according to the present invention.

FIG. 13 is a view showing a light emission part of an LED array. In the drawing, numeral 1301 denotes an exposure apparatus, numerals 1302 and 1303 denote light emission parts on a substrate, numeral 1304 denotes upper electrodes, and numeral 1305 denotes pads. FIG. 14 is a view showing the exposure apparatus 1301 according to the present invention. FIG. 15 is a view showing a main part of an image formation apparatus in which the exposure apparatus according to the present invention is used.

As shown in FIG. 15, light emitted or produced from the light emission parts in the exposure apparatus is exposed on a photosensitive drum 1502 through a rod lens array 1501, and then visualized in an electrophotographic process.

Figure 30:
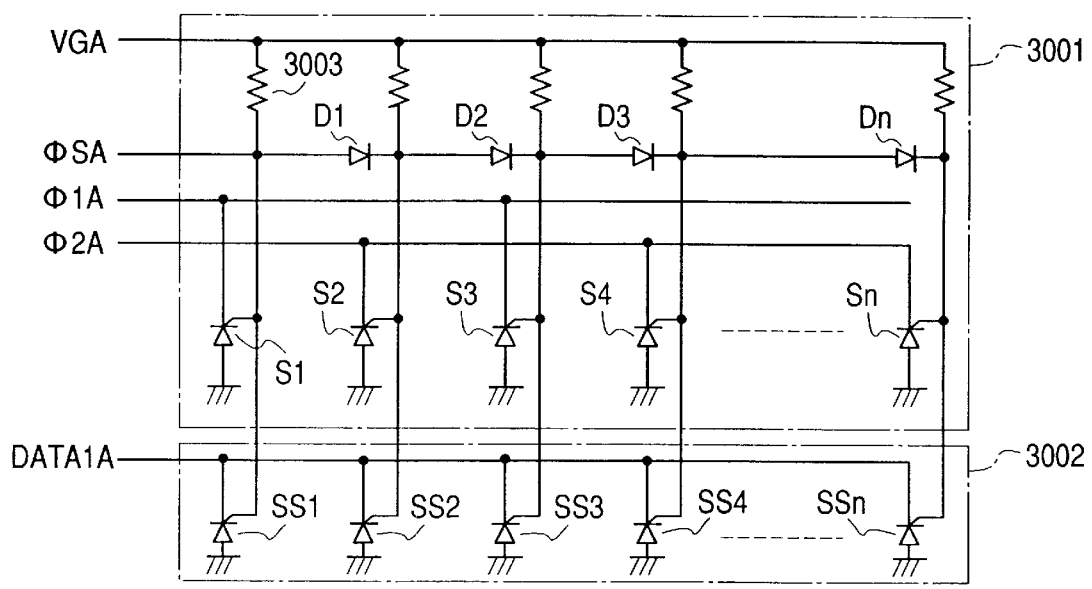
FIG. 30 is a view showing an equivalent circuit of a self-scanning type light emitter chip having a thyristor structure, according to the present invention.

FIG. 30 is a view showing an equivalent circuit of a self-scanning type light emitter chip having a thyristor structure constructing the light emission part in each line of the LED array. In the drawing, numeral 3001 denotes a shift register, numeral 3002 denotes a light emission part, numeral 3003 denotes a load resistor, symbols S1 to Sn denote thyristors acting as switching elements of the shift register 3001, and symbols SS1 to SSn denote thyristors acting as light emission elements of the light emission part 3002. In the above structure, the plural thyristors S1 to Sn and the plural thyristors SS1 to SSn are respectively arranged in array. Gate terminals of the respective thyristors are connected to others through diodes D1 to Dn, and also connected to a power supply VGA by means of the load resistor 3003. A power supply voltage can be made identical for each line. In this case, although light emission amounts of the thyristors in each light emission part of each line are identical, the power supply voltage can be made to vary for each line. If so, the light emission amount is different for each line. Further, although explained later, the light emission amount can be made to vary by making areas of the light emission parts of the thyristors different from others.

Figure 31:
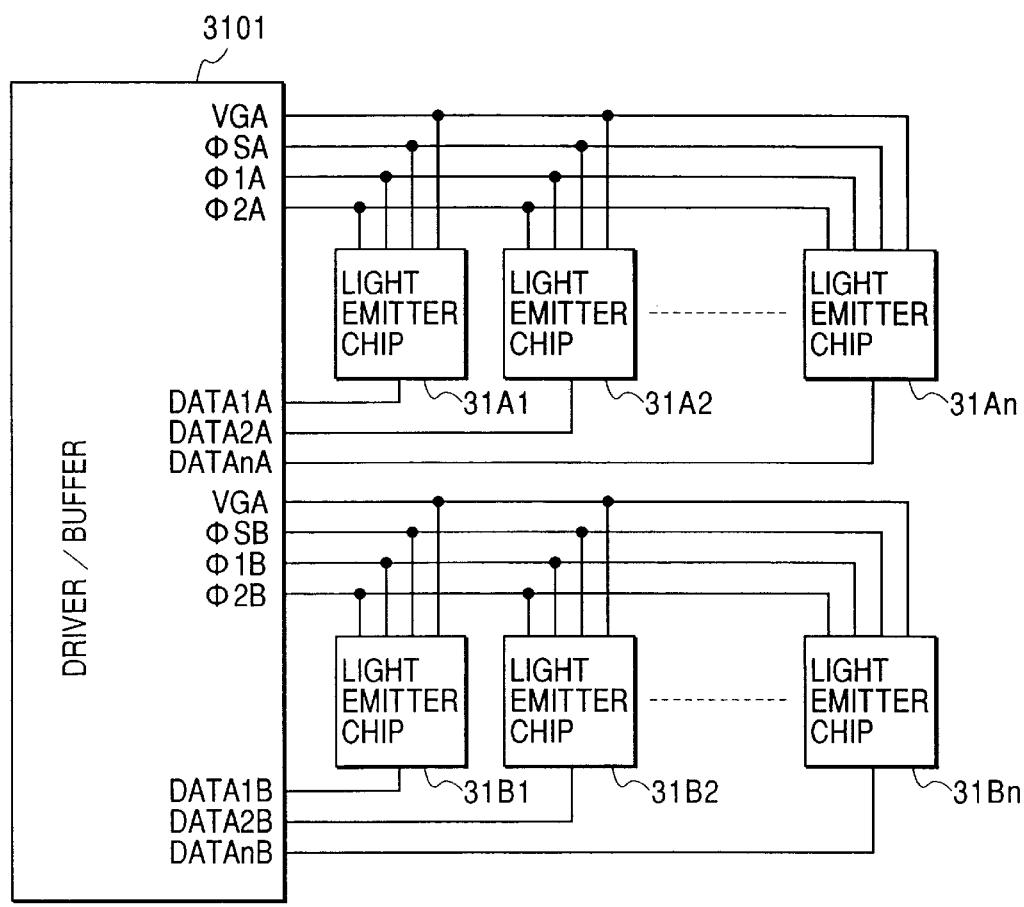
FIG. 31 is a view showing a control unit of a light emitter.
Figure 32:
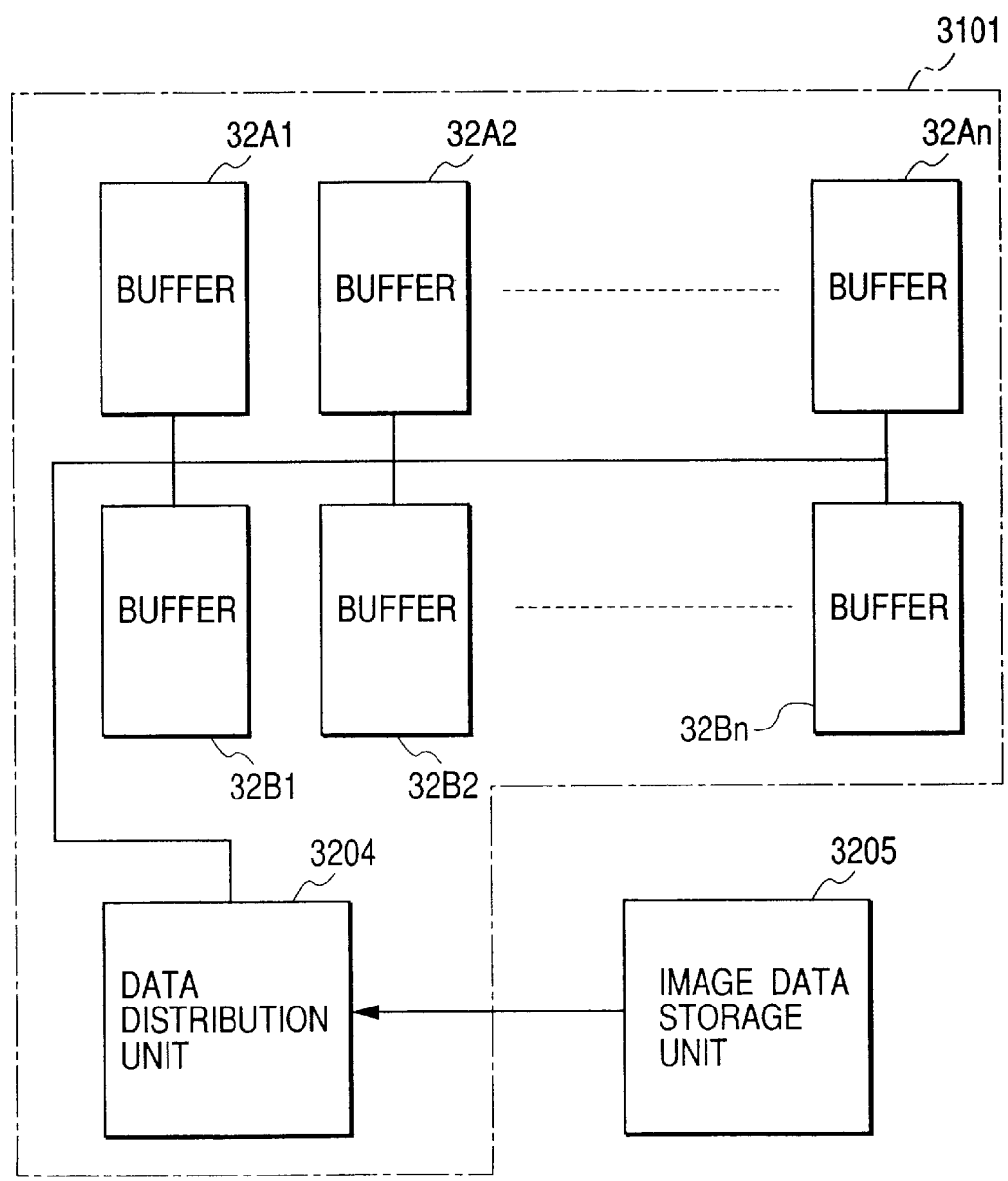
FIG. 32 is a view showing the control unit of the light emitter.

FIGS. 31 and 32 are views showing a control unit of the self-scanning type light emitter chip shown in FIG. 30. In FIG. 31, numeral 3101 denotes a driver/buffer unit for the light emitter chip, and symbols 31A1 to 31An and 31B1 to 31Bn denote chip units (FIG. 18) constituting LED arrays of two lines. That is, the LED array can be realized by arranging these plural chips in a main-scanning direction.

Figure 33:
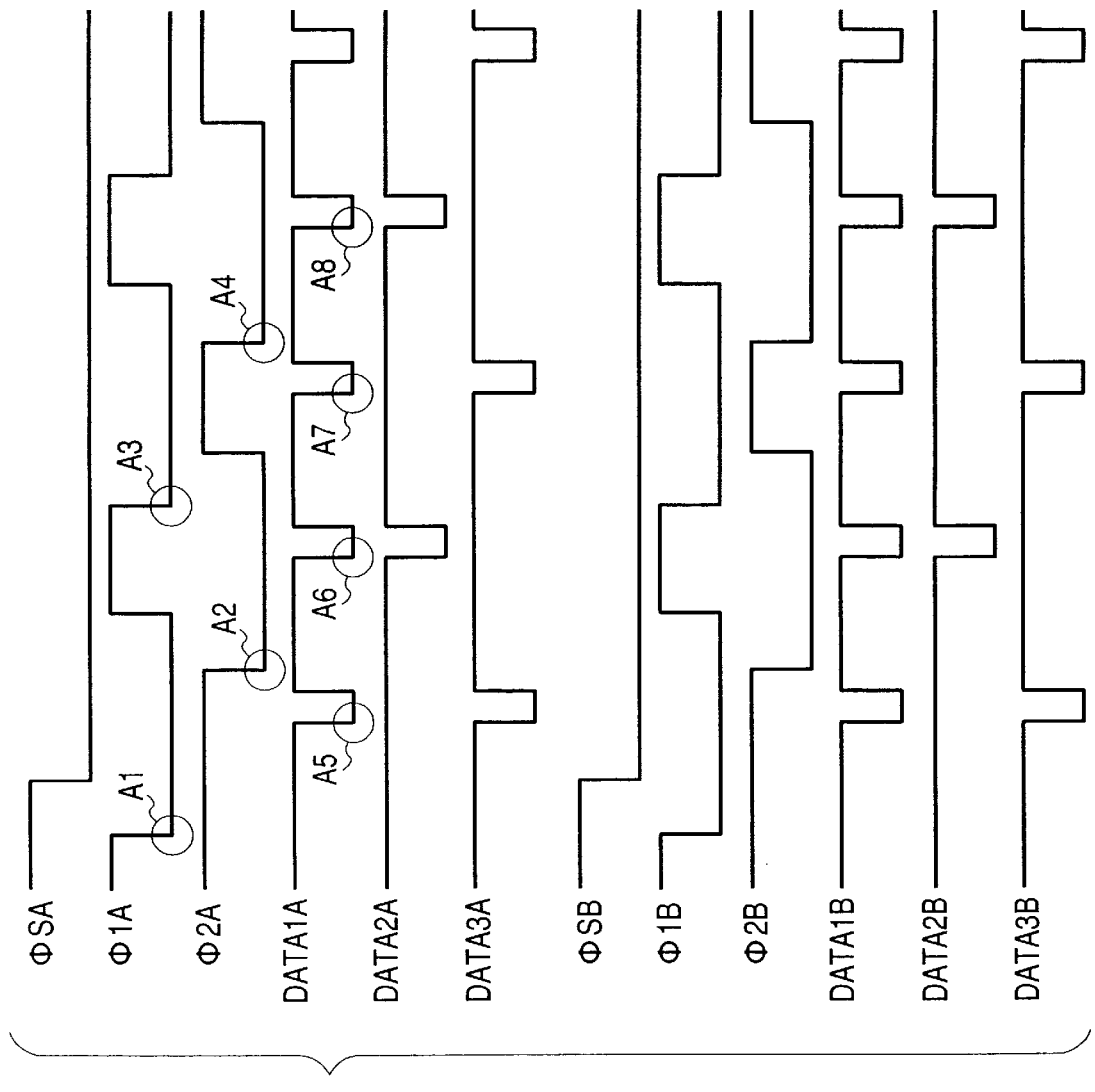
FIG. 33 is a view showing a relation of clocks and data.

In FIG. 32, symbols 32A1 to 32An and 32B1 to 32Bn denote buffer units corresponding to the respective chip units of the respective lines (31A and 31B), numeral 3204 denotes a data distribution unit, and numeral 3205 denotes an image data storage unit. For example, image data input from a host computer to the storage unit 3205 is distributed to the predetermined buffer units 32A1 to 32An and 32B1 to 32Bn by the distribution unit 3204, and then supplied to the chip units together with later-described transfer clocks through the driver. That is, data DATA1A to DATAnA and clocks φSA to φ2A are supplied to one line of the chip units 31A1 to 31An, and data DATA1B to DATAnB and clocks φSB to φ2B are supplied to the other line of the chip units 31B1 to 31Bn. The relation between the clocks and the data is shown in FIG. 33. Although FIG. 30 shows the clocks and the data only for the chip unit 31A1, it can be easily understood that other chip units similarly operate.

As shown in FIG. 33, the transfer clocks φ1A and φ2A for transfer operation are applied to a cathode. At this time, the thyristor S1 is turned on at a point A1, and simultaneously a potential difference appears between both ends of the diode D1. In this state, the thyristor S2 is turned on at a point A2 of the clock φ2A. Simultaneously, a potential difference appears between both ends of the diode D2, and the thyristor S3 is turned on at a point A3 of the clock φ1A. By repeating the above operation, the image data is sequential transferred rightward. When the image data DATA1A is input in synchronism with this operation, "ON" and "OFF" of the thyristors S1, S2, S3 and the like are determined respectively, and it becomes possible to cause the thyristors to perform light emission in response to the image data. Operation timings of the data DATA2A to DATAnA, the clocks φ1B and φ2B and the data DATA1B to DATAnB are substantially the same as those described above. For example, by sequentially scanning the chip units in the order of 31A1, 31A2 and 31A3, the image data of one line is scanned.

In the above case, it should be noted that each of the data DATA1A to DATAnA and DATA1B to DATAnB is one-bit data, and levels "1" and "0" of each bit respectively correspond to "ON" and "OFF" of each thyristor (light emitter). In a case where gradation is represented, one bit is constructed by collecting necessary bits as described later. In other cases, each bit itself is used such that it corresponds to one pixel.

In a case where plural self-scanning type light emission element arrays are provided, scanning functions of the respective arrays can be made common. This will be explained in detail in the eighth embodiment.

When a light emission array which uses a self-scanning type light emission chip having the above thyristor structure is used, it becomes possible to provide a compact, low-cost and higher-density exposure apparatus as compared with conventional one. Moreover, it becomes possible to output an image representing gradation. It should be noted that, although the above-structured exposure apparatus is used the following embodiments, the present invention is not limited to this.

Figure 16:
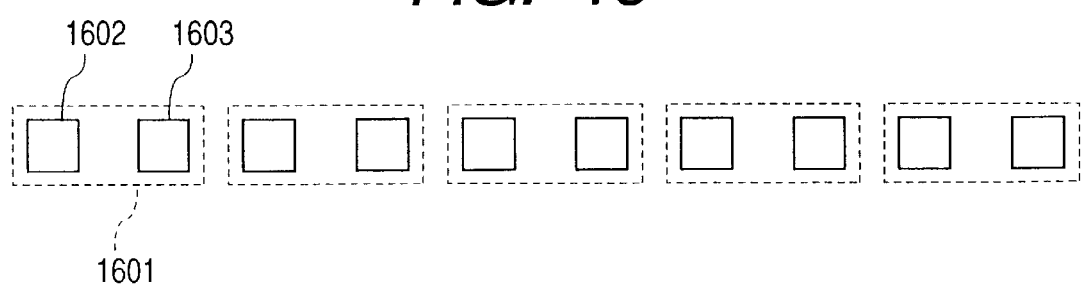
FIG. 16 is a view showing a state that exposure is performed on a photosensitive drum, according to a fourth embodiment of the present invention.

FIG. 16 is a view showing a state of parts on the photosensitive drum 1502 exposed by the exposure apparatus. In the drawing, numeral 1601 denotes a part exposed by the light emission parts 1302 and 1303. Two exposure parts 1602 and 1603 neighboring in the main-scanning direction together represent one pixel.

FIG. 17 is a view showing exposure amounts of the parts multiexposed by the exposure apparatus according to the present invention. In the drawing, numeral 1701 denotes a part exposed by the line of the light emission part 1302, and numeral 1702 denotes a part exposed by the line of the light emission part 1303. In this structure, the square oblique-line parts are exposed by the light emission parts 1302 and 1303, while the square blank parts are not exposed. Numerals 1703 to 1707 respectively denote different exposure amounts. When the parts 1701 and 1702 are respectively divided by dotted lines for every two exposure parts to provide plural sections in the main-scanning direction, since a light emission pattern of each exposure part within each section is different from others, the above different exposure amounts are obtained.

FIG. 18 is a view showing a print result on a recording medium which was exposed by the exposure apparatus and on which the image was formed, and also showing parts 1801 to 1805 respectively separated by dotted lines. In the drawing, the part 1801 is the part multiexposed most intensively, i.e., the part printed most darkly. The printing density becomes lighter in the order of the parts 1802, 1803 and 1804, and the part 1805 is not exposed.

Subsequently, the operation according to the above structure will be explained. When image pattern data is input from the host computer to the image formation apparatus, the light emission parts 1302 and 1303 shown in FIG. 13 perform light emission in response to an input pattern. At this time, as shown in FIG. 16, if the input data represents one pixel composed of the two dots neighboring in the main-scanning direction, an image is formed by using such dots as one block. Further, when the light emission parts 1302 and 1303 multiexpose the identical part on the photosensitive body, the exposure amount of the photosensitive body can be varied by five levels as shown in FIG. 17. Thus, it is possible to form the different-density images as shown in FIG. 18. Ordinary multiexposure can merely represent three-level gradation. However, in the present embodiment, since the neighboring two dots are considered as one pixel and image processing suitable for such a pixel is performed, the gradation of a larger number of levels can be represented. Subsequently, the exposed photosensitive drum 1502 is then subjected to an ordinary process (not shown) according to an electrophotographic system, and a toner corresponding to an obtained image is transferred and fixed onto a copy paper. Then, a series of operations terminates.

As explained above, in the present embodiment, an exposure apparatus composed of the LED arrays of plural lines causes the respective light emission parts to selectively perform light emission to multiexpose the identical line in the main-scanning direction on the photosensitive body, and also two dots neighboring in the main-scanning direction are considered as one pixel. Therefore, multigradation print results can be obtained even if a light emission element array is used.

In the present invention, in the case of forming an image of no gradation such as a text image, when each one dot exposed is used as it is such that one dot corresponds to one pixel, a print result of higher image resolution can be obtained. Also, such a selection as above to select a gradation image process or a text image process can be realized in response to instructions from the host computer.

(Fifth Embodiment)

The fifth embodiment of the present invention will be explained on an image formation apparatus in which the light emission diode (LED) arrays are used, with reference to FIGS. 13, 14, 15, 19, 20 and 21.

FIG. 19 is a view showing a state of parts on the photosensitive drum 1502 exposed by the LED array. In the drawing, numeral 1901 denotes a part which is exposed by the light emission parts 1302 and 1303, and represents one pixel composed of four exposure parts 1902, 1903, 1904 and 1905 neighboring in main- and sub-scanning directions.

Figure 20:
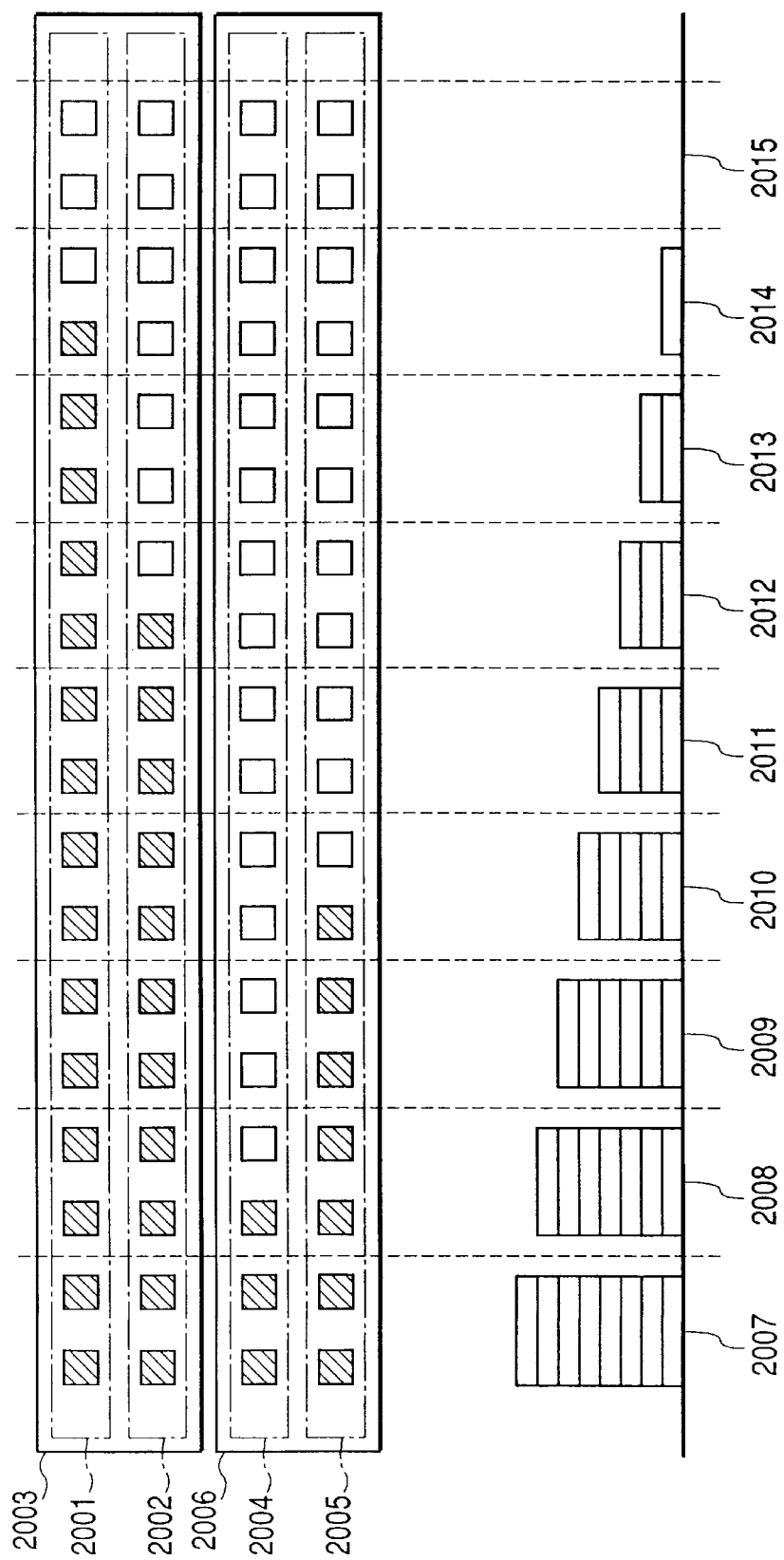
FIG. 20 is a view showing lighting of an LED array according to the fifth embodiment of the present invention.

FIG. 20 is a view showing exposure amounts of the parts multiexposed by the LED arrays according to the present invention. In the drawing, numerals 2001 and 2004 denote parts exposed by the line of the light emission part 1302, and numerals 2002 and 2005 denote parts exposed by the line of the light emission part 1303. In this structure, the square oblique-line parts are exposed by the light emission parts 1302 and 1303, while the square blank parts are not exposed. Numerals 2003 and 2006 respectively denote exposure lines neighboring in the sub-scanning direction. Numerals 2007 to 2015 respectively denote different exposure amounts. When the lines 2003 and 2006 are respectively divided by dotted lines for every two exposure parts to provide plural sections in the main-scanning direction, since a light emission pattern of each exposure part within each section is different from others, the above different exposure amounts are obtained. FIG. 21 is a view showing a print result on a recording medium which was exposed by the exposure apparatus and on which the image was formed, and also showing parts 2101 to 2109 respectively separated by dotted lines. In the drawing, the part 2101 is the part multiexposed most intensively, i.e., the part printed most darkly. The printing density becomes lighter in the order of the parts 2102, 2103, 2104, . . . , and the part 2109 is not exposed.

Subsequently, the operation according to the above structure will be explained. When an image pattern is input from a host computer to the image formation apparatus, the light emission parts 1302 and 1303 shown in FIG. 13 perform light emission in response to the input pattern. At this time, as shown in FIG. 19, if the input data represents one pixel composed of the four dots neighboring in the main- and sub-scanning directions, an image is formed by using such dots as one block. Further, when the light emission parts 1302 and 1303 multiexpose the identical part on the photosensitive body, the exposure amount of the photosensitive body can be varied by nine levels as shown in FIG. 20. Thus, it is possible to form the different-density images shown in FIG. 21. Ordinary multiexposure can merely represent three-level gradation. However, in the image formation apparatus according to the present embodiment, since the neighboring dots are considered as one pixel and image processing suitable for such a pixel is performed, the gradation of a larger number of levels can be represented. Subsequently, the exposed photosensitive drum 1502 is then subjected to an ordinary process (not shown) according to an electrophotographic system, and a toner corresponding to an obtained image is transferred and fixed onto a copy paper. Then, a series of operations terminates.

As explained above, in the present embodiment, an exposure apparatus composed of the LED arrays of the plural lines causes the respective light emission parts to selectively perform light emission to multiexpose the identical line in the main-scanning direction, and also the four dots neighboring in the main- and sub-scanning directions are managed as one pixel. Therefore, higher-gradation print results can be obtained even if an LED array is used.

In the present invention, in the case of forming an image of no gradation such as a text image, when each one dot exposed is used such that one dot corresponds to one pixel, a print result of higher image resolution can be obtained. Also, a gradation image process or a text image process can be realized in response to instructions from the host computer.

(Sixth Embodiment)

The sixth embodiment of the present invention will be explained on an image formation apparatus in which light emission diode (LED) arrays are used, with reference to FIGS. 22, 23, 24, 25, 26 and 27.

Figure 22:
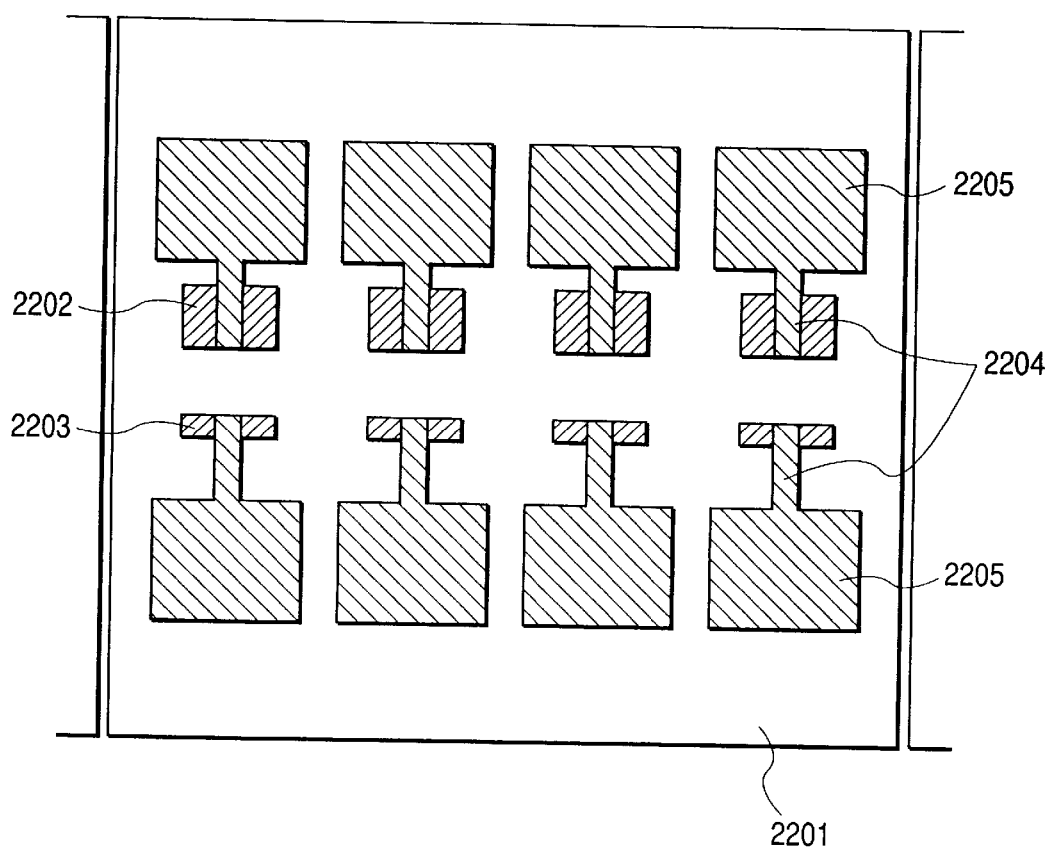
FIG. 22 is a conceptional view showing an LED chip according to the present invention.
Figure 23:
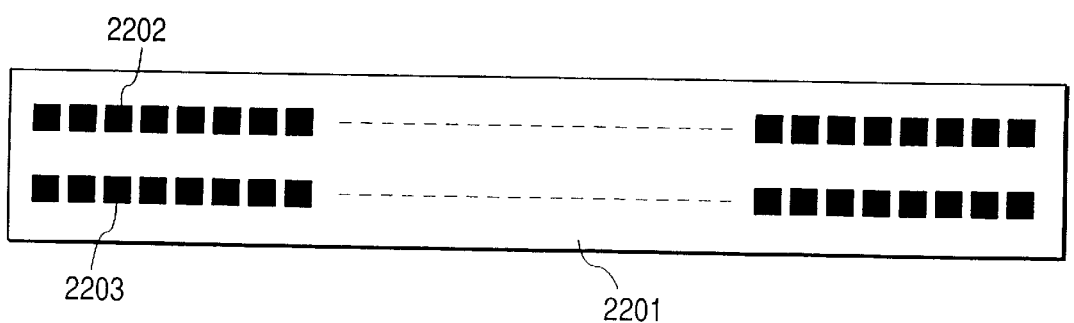
FIG. 23 is a conceptional view showing the LED chip according to the present invention.
Figure 24:
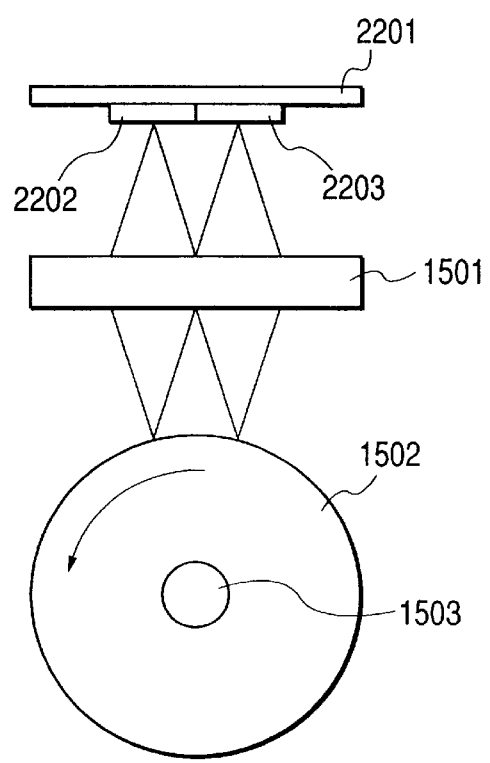
FIG. 24 is a view showing a main part of an image formation apparatus according to the present invention.

FIG. 22 is a view showing a light emission part of an exposure apparatus according to the present invention. In the drawing, numeral 2201 denotes the exposure apparatus, and numerals 2202 and 2203 denote light emission parts on a substrate. Since an area of the part 2202 is different from that of the part 2203, light emission amounts of these parts are different from each other. Numeral 2204 denotes upper electrodes, and numeral 2205 denotes pads. FIG. 23 is a view showing the LED array according to the present invention. FIG. 24 is a view showing a main part of the image formation apparatus in which the exposure apparatus 2201 is used.

As shown in FIG. 24, light emitted or produced from the exposure apparatus 2201 is exposed on a photosensitive drum 1502 through a rod lens array 1501, and then visualized in an electrophotographic process.

Figure 25:
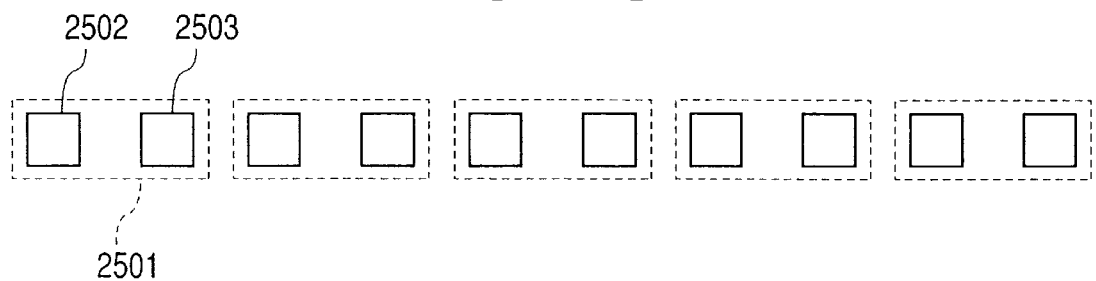
FIG. 25 is a view showing a state that exposure is performed on a photosensitive drum, according to a sixth embodiment of the present invention.

FIG. 25 is a view showing a state of parts on the photosensitive drum 1502 exposed by the LED array. In the drawing, numeral 2501 denotes a part which is exposed by the light emission parts 2202 and 2203, and represents one pixel composed of two exposure parts 2502 and 2503 neighboring in a main-scanning direction.

Figure 26:
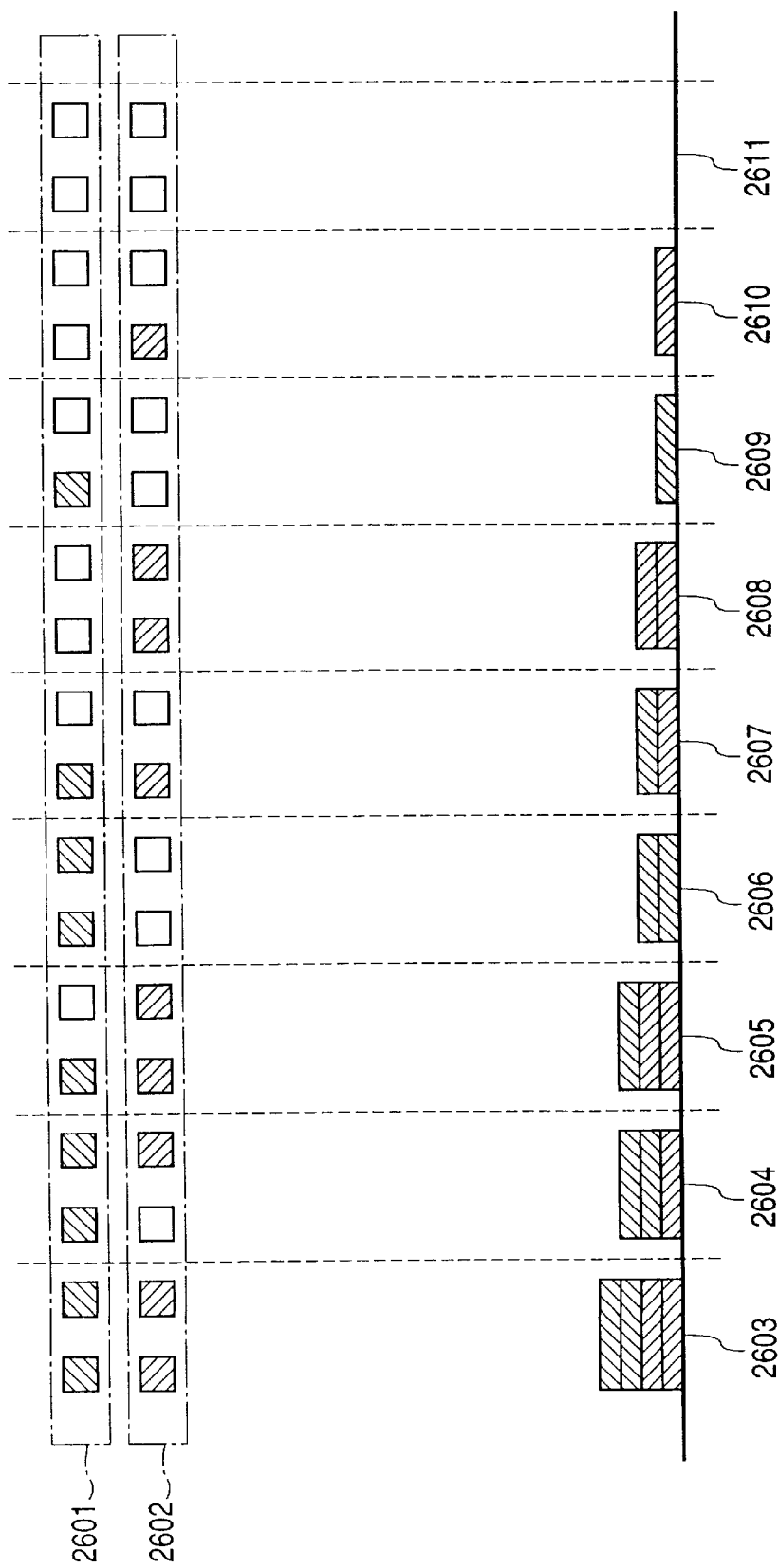
FIG. 26 is a view showing lighting of an LED array according to the sixth embodiment of the present invention.

FIG. 26 is a view showing exposure amounts of the parts multiexposed by the exposure apparatus according to the present invention. In the drawing, numerals 2601 denotes a part exposed by the line of the light emission part 2202, and numeral 2602 denotes a part exposed by the line of the light emission part 2203. In this structure, the square oblique-line parts are exposed by the light emission parts 2202 and 2203, while the square blank parts are not exposed. Numerals 2603 to 2611 respectively denote the different exposure amounts. When the parts (i.e., lines) 2601 and 2602 are respectively divided by dotted lines for every two exposure parts to provide plural sections in the main-scanning direction, since a light emission pattern of each exposure part within each section is different from others, the above different exposure amounts are obtained.

Figure 27:
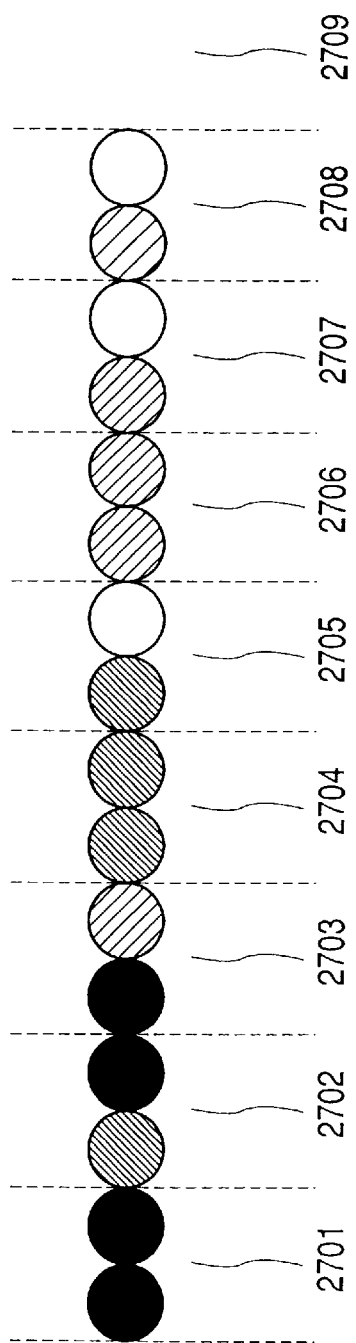
FIG. 27 is a view showing a print result according to the sixth embodiment of the present invention.

FIG. 27 is a view showing a print result on a recording medium which was exposed by the exposure apparatus and on which the image was formed, and also showing parts 2701 to 2709 respectively separated by dotted lines. In the drawing, the part 2701 is the part multiexposed most intensively, i.e., the darkest-density part. The printing density becomes lighter in the order of the parts 2702, 2703, 2704, . . . , and the part 2709 is not exposed.

Subsequently, the operation according to the above structure will be explained. When an image pattern is input from a host computer to the image formation apparatus, the light emission parts 2202 and 2203 shown in FIG. 22 perform light emission in response to the input pattern. At this time, as shown in FIG. 25, if the input data represents one pixel composed of the two dots neighboring in the main-scanning direction, an image is formed by using such dots as one block. Further, when the light emission parts 2202 and 2203 multiexpose the identical part on the photosensitive body, the exposure amount of the photosensitive body can be varied by nine levels as shown in FIG. 26. Thus, it is possible to form the different-density images shown in FIG. 27. Ordinary multiexposure can merely represent three-level gradation. However, in the image formation apparatus according to the present embodiment, the two dots neighboring in the main-scanning direction are considered as one pixel to be managed by using the LED arrays in which the area of the light emission part is different for each array and thus the light emission amount is different from others, and image processing suitable for such a pixel is performed, whereby gradation of a larger number of levels can be represented. Subsequently, the exposed photosensitive drum 1502 is then subjected to an ordinary process (not shown) according to an electrophotographic system, and a toner corresponding to an obtained image is transferred and fixed onto a copy paper. Then, a series of operations terminates.

As explained above, in the present embodiment, the LED arrays of the plural lines, in which the light emission area and amount are different for each line, are caused to selectively perform light emission and multiexpose the identical line in the main-scanning direction on the photosensitive body. Moreover, two dots neighboring in the main-scanning direction are considered and managed as one pixel. Therefore, higher-gradation print results can be obtained even if the LED array is used.

In the present invention, in case of forming an image of no gradation such as a text image, when each one dot exposed is used such that one dot corresponds to one pixel, a print result of higher image resolution can be obtained. Also, a gradation image process or a text image process can be realized in response to instructions from the host computer.

(Seventh Embodiment)

The seventh embodiment of the present invention will be explained on an exposure apparatus in which light emission diode (LED) arrays are used, with reference to FIGS. 22, 23, 24, 28 and 29.

Figure 28:
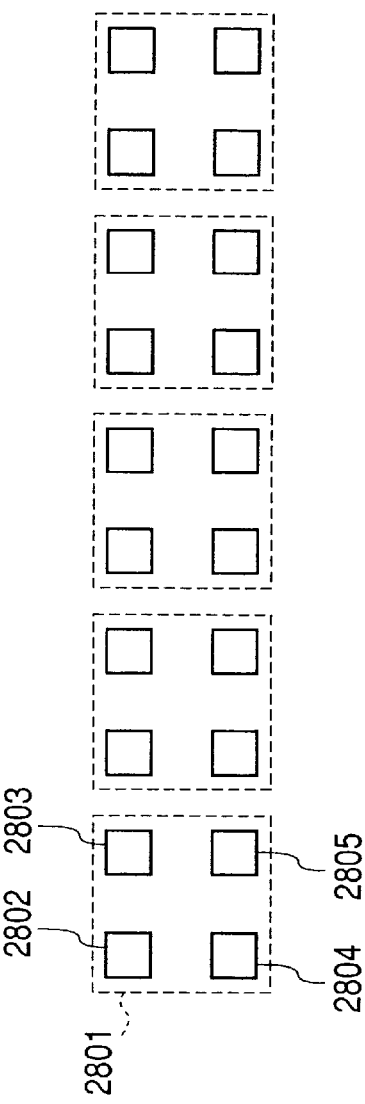
FIG. 28 is a view showing a state that exposure is performed on a photosensitive drum, according to a seventh embodiment of the present invention.

FIG. 28 is a view showing a state of parts on the photosensitive drum 1502 exposed by the LED array. In the drawing, numeral 2801 denotes a part which is exposed by the light emission parts 2202 and 2203, and represents one pixel composed of four exposure parts 2802, 2803, 2804 and 2805 neighboring in main- and sub-scanning directions.

Figure 29A:
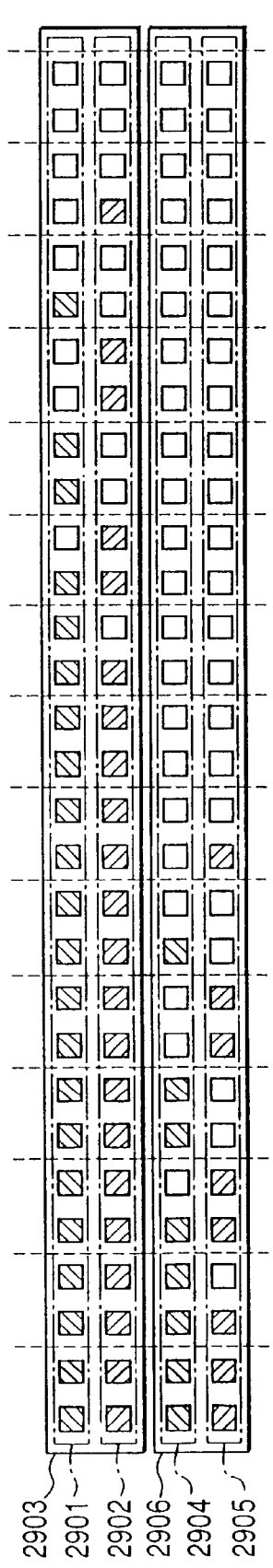
FIGS. 29A and 29B are views showing lighting of an LED array according to the seventh embodiment of the present invention.
Figure 29B:
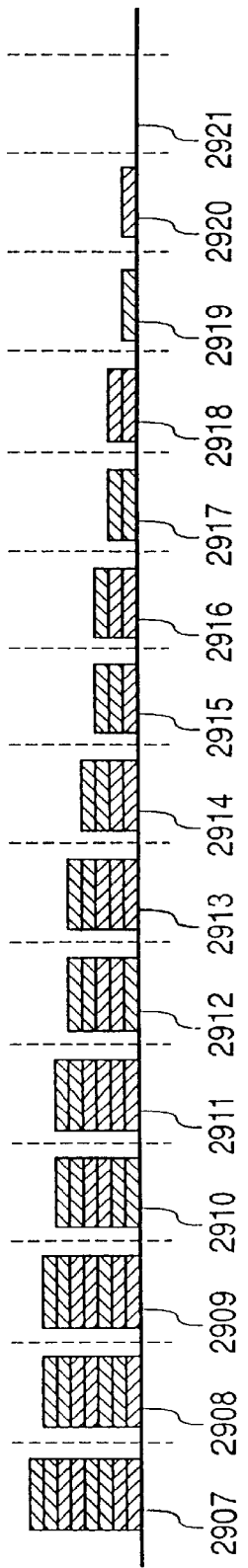

FIG. 29 is a view showing exposure amounts of the parts multiexposed by the exposure apparatus according to the present invention. In the drawing, numerals 2901 and 2904 denote parts exposed by the line of the light emission part 2202, and numerals 2902 and 2905 denote parts exposed by the line of the light emission part 2203. In this structure, the square oblique-line parts are exposed by the light emission parts 2202 and 2203, while the square blank parts are not exposed. Numerals 2903 and 2906 respectively denote exposure lines neighboring in the sub-scanning direction. Further, numerals 2907 to 2921 respectively denote the different exposure amounts. When the exposure lines 2903 and 2906 are respectively divided by dotted lines for every two exposure parts to provide plural sections in the main-scanning direction, since a light emission pattern of each exposure part within each section is different from others, the above different exposure amounts are obtained.

Subsequently, the operation according to the above structure will be explained. When an image pattern is input from a host computer to the image formation apparatus, the light emission parts 2202 and 2203 shown in FIG. 22 perform light emission in response to the input pattern. At this time, as shown in FIG. 28, if the input data represents one pixel composed of the four dots neighboring in the main- and sub-scanning directions, an image is formed by using such dots as one block. Further, when the light emission parts 2202 and 2203 multiexpose the identical part on the photosensitive body, the exposure amount of the photosensitive body can be varied by 15 levels as shown in FIG. 29. Thus, it is possible to form different-density images. In the image formation apparatus according to the present embodiment, the four dots neighboring in the main- and sub-scanning directions are considered as one pixel to be managed by using the LED arrays in which the area of the light emission part is different for each array and thus the light emission amount is different from others, and image processing suitable for such a pixel is performed, whereby a gradation of a larger number of levels can be represented. Subsequently, the exposed photosensitive drum 1502 is then subjected to an ordinary process (not shown) according to an electrophotographic system, and a toner corresponding to an obtained image is transferred and fixed onto a copy paper. Then, a series of operations terminates.

As explained above, in the present embodiment, the light emission parts in the LED arrays of the plural lines are caused to selectively perform light emission and overlappingly expose the identical line in the main-scanning direction. Moreover, the four dots neighboring in the main- and sub-scanning directions are considered and managed as one pixel. Therefore, higher-gradation print results can be obtained even if the LED array is used.

In the present invention, in a case where data which does not represent any gradation is managed, by using each dot exposed as it is, a print result of higher image resolution can be obtained. Also, a method to select such a data process can be realized in response to instructions from the host computer.

As explained above, the following effects can be derived according to the present invention.

(1) An image formation apparatus which can represent gradation by means of an exposure apparatus using the LED arrays can be provided.

(2) Since the dots neighboring in the main- and sub-scanning directions are selected from among the dots multiexposed by the LED arrays at the identical part on the photosensitive body and then managed as one pixel, an image formation apparatus which can represent a larger number of gradations can be provided.

(3) Since an LED array is used, an apparatus of small size compared with an image formation apparatus an electrophotographic system having an exposure apparatus of a laser system can be provided.

(4) Since the present invention is applied to an image formation apparatus of an electrophotographic system capable of outputting a color image, a multivalue and multigradation image can be provided.

(5) Since an exposure apparatus of a so-called light emission point transfer type, in which the plural light emission points in an LED array are sequentially transferred, is used, it becomes unnecessary to perform one-to-one wiring between the LED and the pixel. Therefore, the amount of wire bonding for applying current to cause the LED to perform light emission can be remarkably reduced even if the LED pixels are made highly denser, thereby realizing an apparatus that is more compact in size.

(Eighth Embodiment)

Hereinafter, the eighth embodiment of the present invention will be explained with reference to FIGS. 34 to 40.

Figure 38:
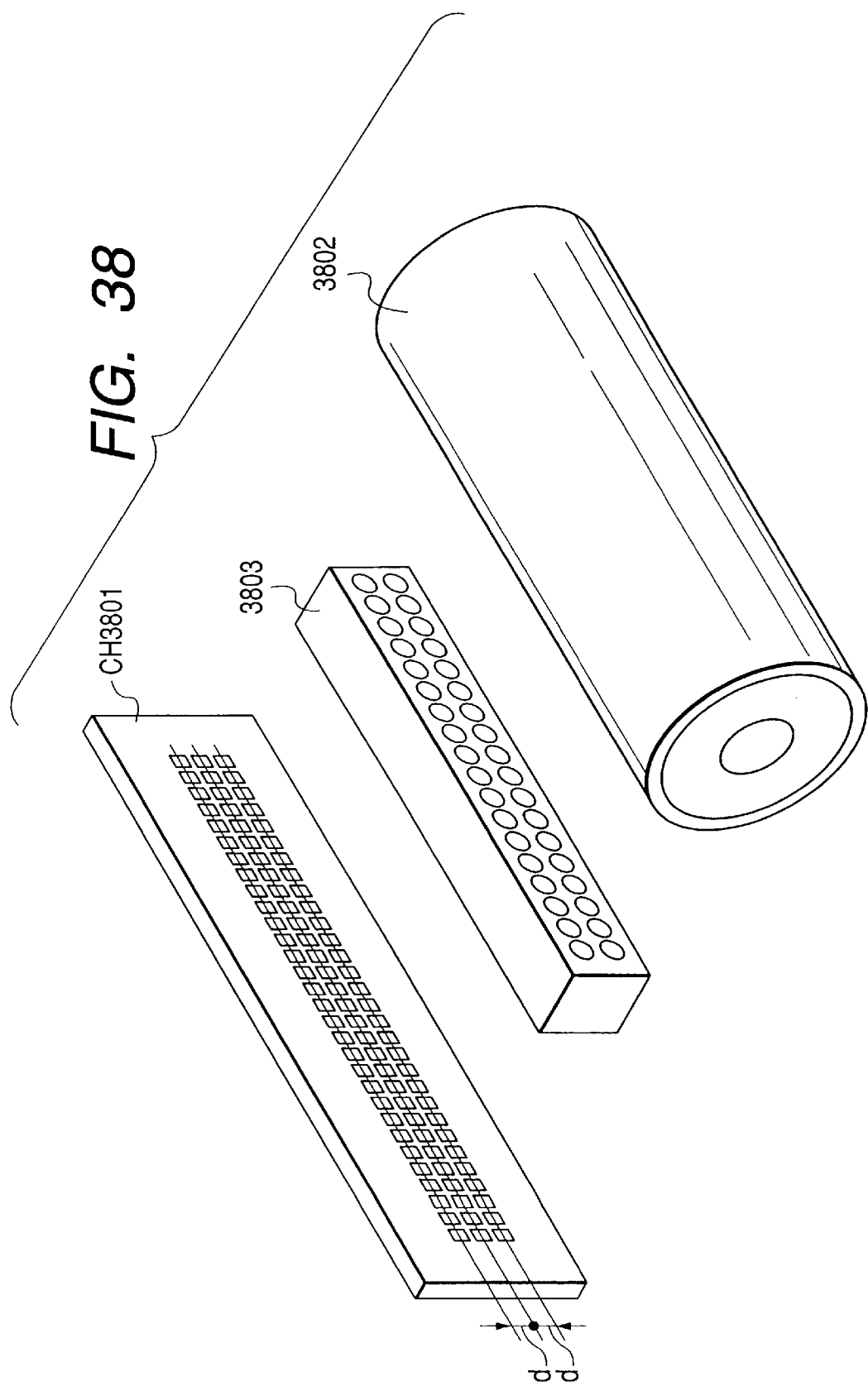
FIG. 38 is a view schematically showing positional relation of the light emission element chip, an imaging element and an image support body respectively provided within an exposure apparatus according to the eighth embodiment of the present invention.
Figure 39:
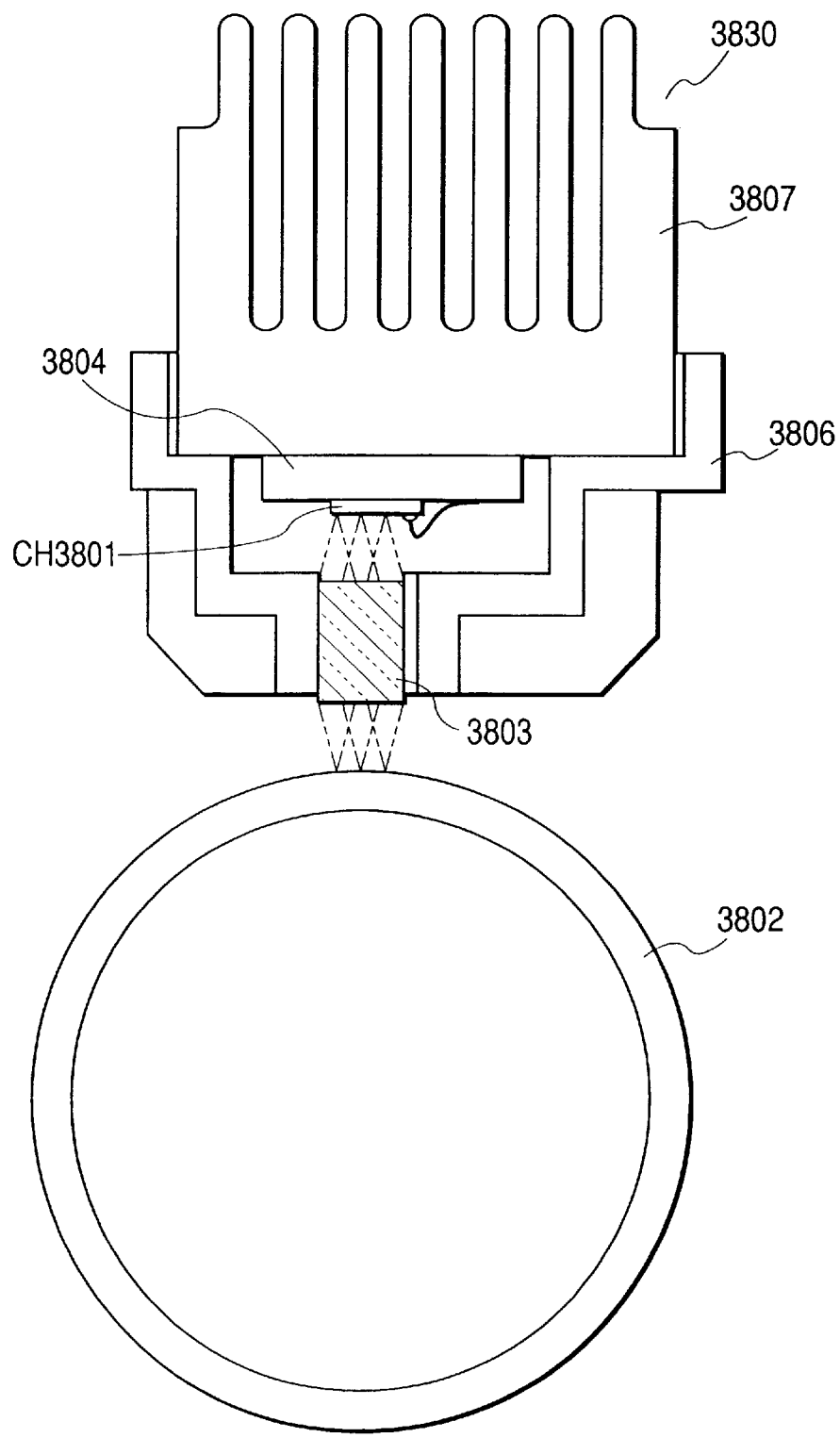
FIG. 39 is a sectional view showing the exposure apparatus and the image support body according to the eighth embodiment of the present invention.

Initially, a schematic of entire structure of the an exposure apparatus according to the present invention will be explained with reference to FIGS. 38 and 39. FIG. 38 is a view schematically showing a positional relation of a light emission element chip array CH3801 mounted inside the exposure apparatus 3830, an image support body 3802, and a rod lens array 3803 for focusing luminous flux emitted from light emission elements to form an image on the light emission element chip array CH3801. FIG. 39 is a sectional view showing an exposure apparatus 3830 and the image support body 3802 exposed by the apparatus 3830.

In FIGS. 38 and 39, three lines of the light emission elements are arranged on the light emission element chip array CH3801. In the line, the plural light emission elements are linearly arranged. A line direction of the chip array CH3801 is in parallel with a rotational axis of a cylindrical-shape image support body 3802, such as a photosensitive drum or the like. Further, between the chip array CH3801 and the image support body 3802 is provided a rod lens array 3803 on which two rod lens lines each containing numerous rod lenses are arranged substantially in parallel with the light emission element line on the chip array CH3801. The luminous flux emitted from the light emission element line on the chip array CH3801 is accurately positioned to a position on a surface of the image support body 3802 at which the luminous flux is focused to form a microspot.

In the exposure apparatus 3830, the light emission element chip array CH3801 is mounted on a light emission element chip mounting substrate 3804. Similarly, a driver chip (not shown) for driving each light emission element, a limiting resistor (not shown) and the like are mounted on the mounting substrate 3804. The mounting substrate 3804 is fixed to a base 3807 also acting as a heat radiator, by an adhesive. Further, the rod lens array 3803 is fixed to a cover 3806 having a function to prevent light leakage from the chip array CH3801, and accurately positioned relative to a position on the surface of the image support body 3802 at which the luminous flux is focused to form the microspot as described above.

Figure 40:
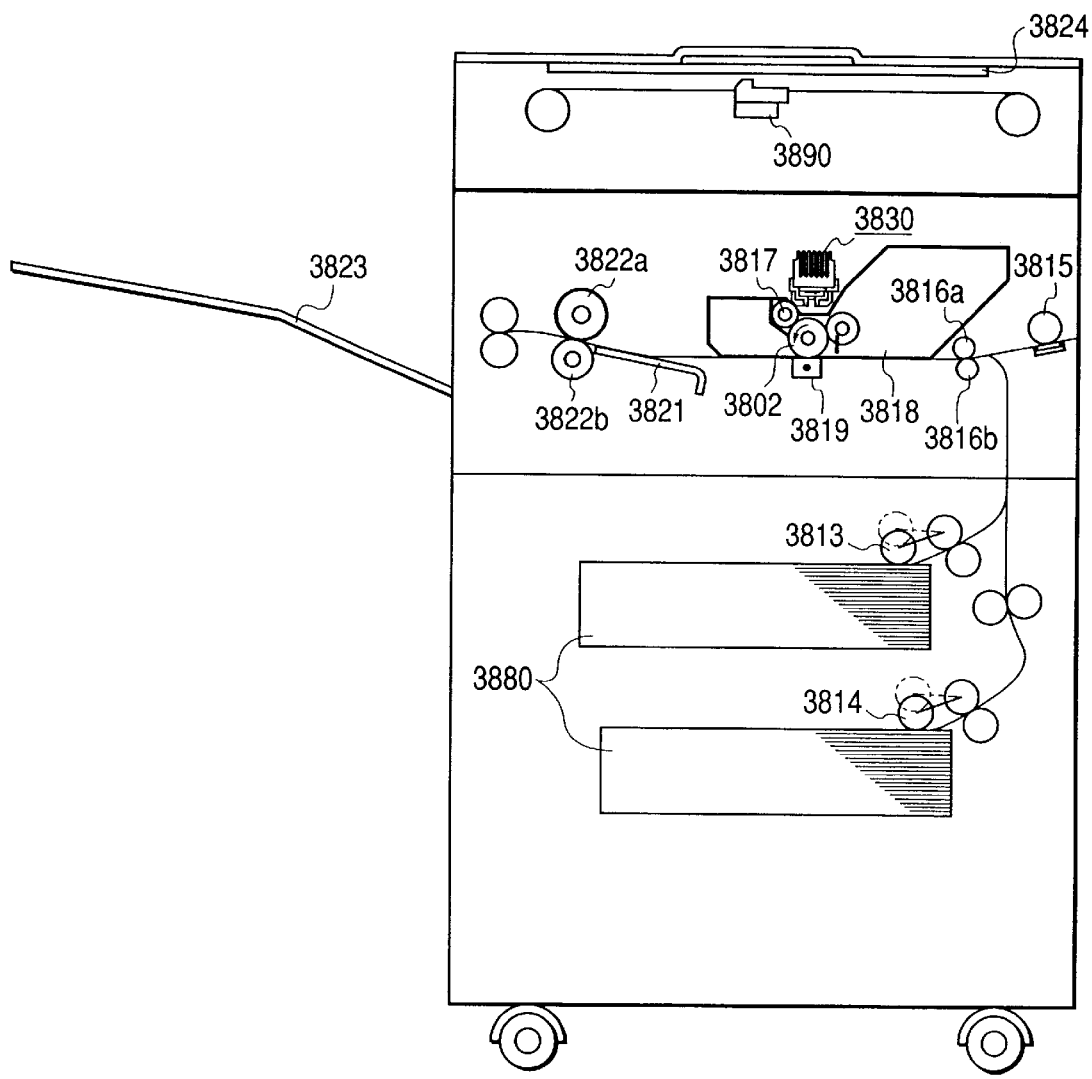
FIG. 40 is a view showing an example of an image formation apparatus in which the exposure apparatus according to the eighth embodiment of the present invention is built.

As shown in FIG. 40, the exposure apparatus 3830 is installed in an image formation apparatus, as its exposure unit.

Subsequently, an operation of, e.g., a copy machine will be explained as the image formation apparatus in which the exposure apparatus according to the present embodiment is installed, with reference to FIG. 40.

An original put on an original mounting board 3824 is read and converted into image data by a reading system 3890. On the other hand, a recording material 3880 is fed from a feeding roller 3813 or 3814 in the copy machine or externally fed through a feeding roller 3815. When the recording material 3880 reaches a position between resist rollers 3816a and 3816b, a leading position of the material 3880 is detected by a sensor (not shown), and then the material 3880 is further fed by the resist rollers 3816a and 3816b at a predetermined timing. On the other hand, a charger 3817 is previously charged according to the image data, and an image support body 3802 rotated in a direction indicated by an arrow is exposed by the exposure apparatus 3830 to form an electrostatic image thereon. According to the formed electrostatic image, a development agent (not shown) is added to the image support body 3802 by a development unit 3818. Then, the image support body 3802 added with the development agent is rotated to a position on a transfer unit 3819, and simultaneously the recording material 3880 reaches a position on the transfer unit 3819 where the development agent is transferred onto the recording material 3880 by the transfer unit 3819. Then, the recording material 3880 reaches fixing units 3822a and 3822b through a feeding path 3821, and the transferred development agent is fixed to the recording material 3880. After then, the material 3880 is discharged on a tray 3823, and an image formation operation terminates.

On the other hand, driving means (not shown) such as a motor or the like, for driving the image support body is added with a control means capable of changing speed during a period that the image support body is being discharged by the exposure apparatus 3830.

Subsequently, the light emission element chip and a method to drive the chip will be explained with reference to FIGS. 34, 35, 36 and 37.

Figure 34:
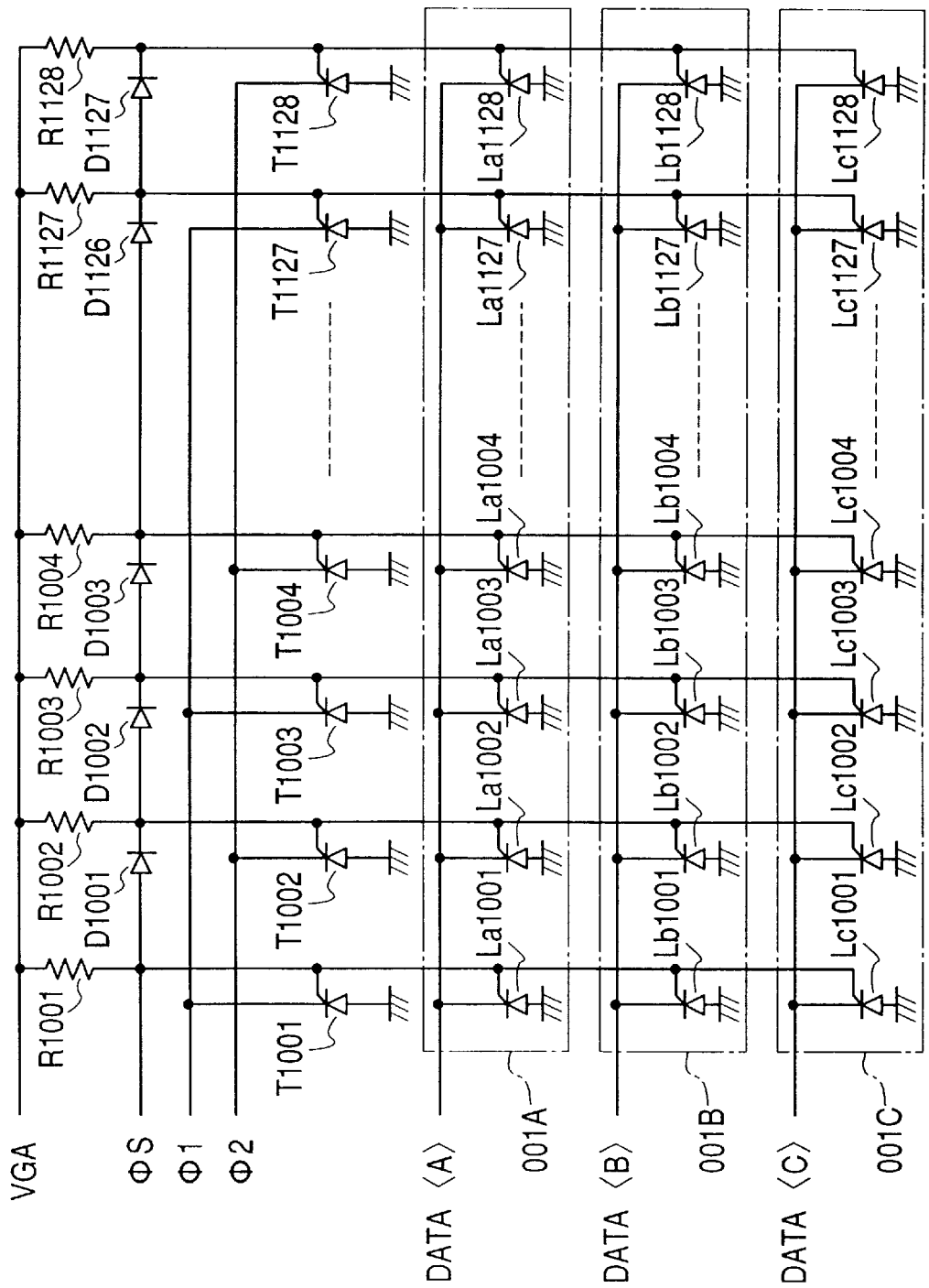
FIG. 34 is a view showing an equivalent circuit of a light emission element chip inside circuit according to an eighth embodiment of the present invention.

FIG. 34 is a view showing an equivalent circuit of a self-scanning type light emitter chip of thyristor structure according to the present embodiment. Hereinafter, an operation principle and controlling of the light emission element line will be explained.

Although FIG. 34 merely shows the inside structure of one light emission element chip, other light emission element chips have the same structure. Three light emission element lines 001A, 001B and 001C are provided inside the light emission element chip, and each light emission element line has, e.g., 128 light emission thyristors. However, any number of thyristors equal to or larger than "2" may be used. In the drawing, symbols La1001, La1002, . . . , La1128 denote light emission thyristors acting as the light emission elements of the first light emission element line 001A, symbols Lb1001, Lb1002, . . . , Lb1128 denote light emission thyristors acting as the light emission elements of the second light emission element line 001B, and symbols Lc1001, Lc1002, . . . , Lc1128 denote light emission thyristors acting as the light emission elements of the third light emission element line 001C. These thyristors are arranged in array. Further, symbols R1001, R1002, . . . , R1128 denote load resistors, symbols D1001, D1002, . . . , D1127 denote diodes, and symbols T1001, T1002, . . . , T1128 denote switching elements each having a light emission thyristor. Such resistors, diodes and switching elements are respectively arranged in array. Symbol VGA denotes a power supply (line), symbol φS denotes a start pulse (line), and symbols DATA<A>, DATA<B> and DATA<C> denote writing signals (lines) for the light emission thyristors in each light emission element line.

In this structure, for example, gate terminals of the switching elements T1001 and T1002 are connected to each other through the diode D1001, and also connected to the power supply VGA respectively through the load resistors R1001 and R1002. On the other hand, transfer clocks φ1 and φ2 for transfer operations are respectively applied to cathodes of the switching elements T1001 and T1002.

Subsequently, a light emission operation of the light emission element line will be explained with reference to FIGS. 34 and 36. In the drawings, a case where pulse widths of the writing signals to the respective light emission elements are identical in each light emission element line will be explained by way of example.

Figure 36:
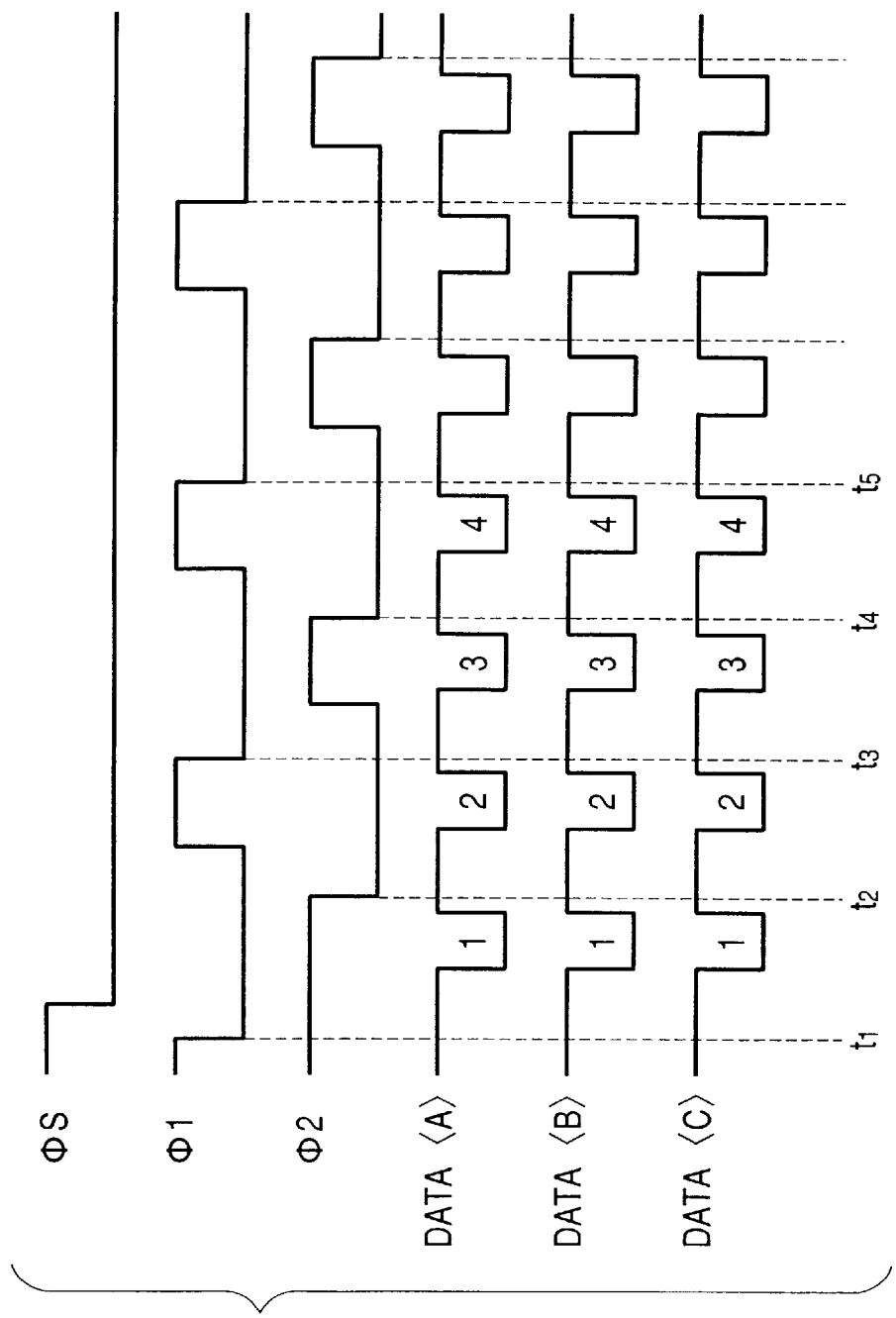
FIG. 36 is an operation waveform chart in a case where writing signals having an identical pulse width are applied to each light emission element line, according to the eighth embodiment of the present invention.

FIG. 36 shows time and pulse states of each signal in such a mode as the pulse widths of the writing signals applied to each light emission element line are substantially identical.

In FIG. 36, at a time t1, if it is assumed that one switching element T1001 is currently in an ON state based on the transfer clock φ1, its gate potential is substantially "0" volt.

This potential has influence rightward through the diode D1001. Then, at a time t2, since only the rightward elements are selectively turned on in response to the next clock φ2, it becomes possible to transfer the data rightward. When a data clock corresponding to image information is written simultaneously with addressing between the times t1 and t2 and the pulses representing "1" are applied to the data lines DATA<A>, DATA<B> and DATA<C> in FIG. 34, the corresponding light emission thyristors La1001, Lb1001 and Lc1001 perform light emission simultaneously. In this case, each light emission element can be in an OFF state according to the given image signal. Further, since the switching element T1002 is addressed between the times t2 and t3, the thyristors La1002, Lb1002 and Lc1002 can perform light emission. By repeating such a transferring operation and ON/OFF switching of the writing signals, it is possible to cause the predetermined thyristors to perform light emission according to the image data.

Subsequently, respective signal lines through which the signals are applied to the plural light emission element chips in the exposure apparatus will be explained with reference to FIG. 35.

Figure 35:
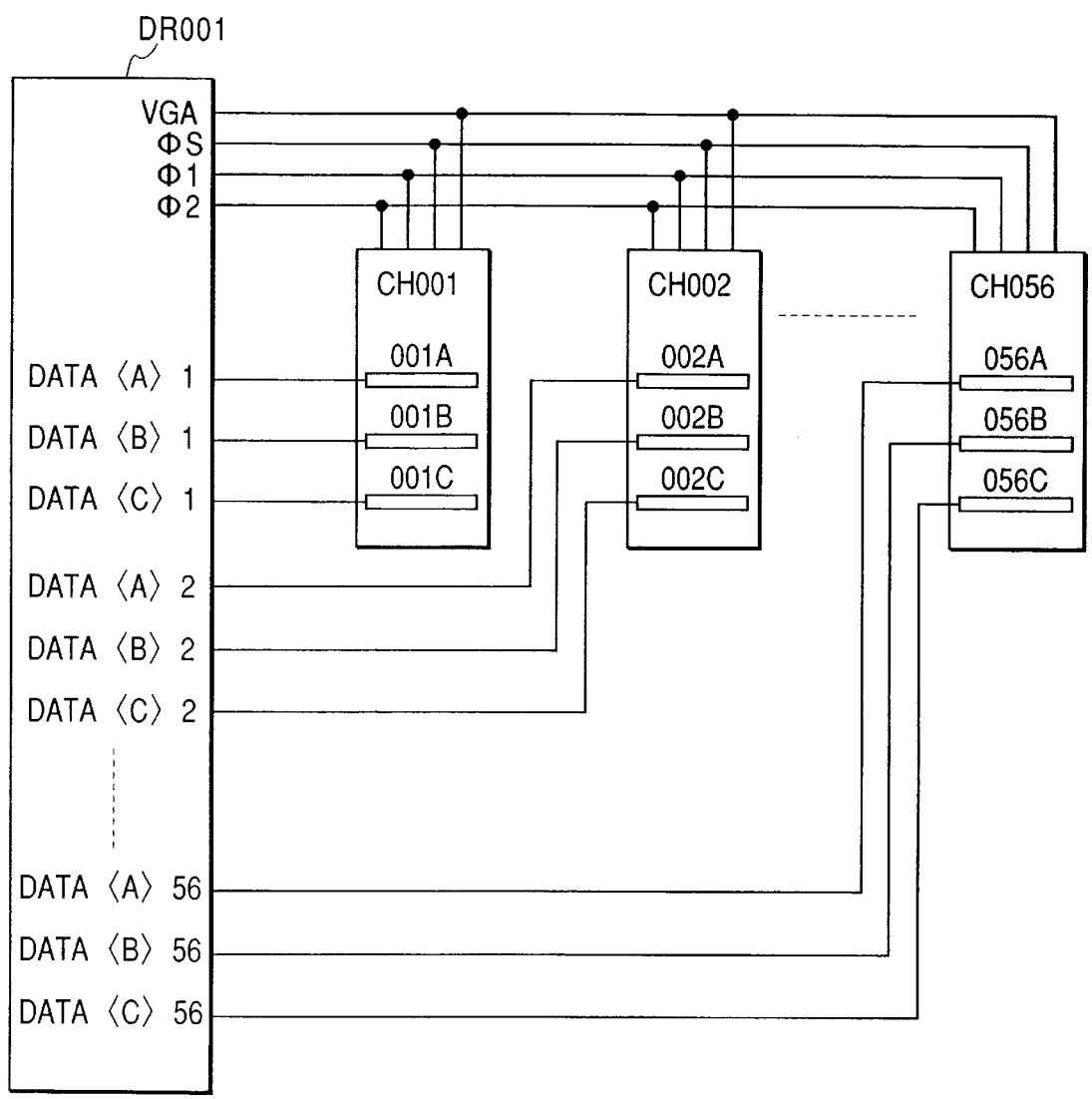
FIG. 35 is a view showing a connection between a light emission element chip array and a driver, according to the eighth embodiment of the present invention.

In FIG. 35, symbols CH001, CH002, . . . , CH056 denote light emission element chips, and symbol DR001 denotes a driver unit to control the light emission operation of the exposure apparatus. In the drawing, although the exposure apparatus in which the 56 light emission element chips are arranged to form the light emission chip array will be explained by way of example, any number of chips equal to or larger than "1" may be used. The signals VGA, φS, φ1 and φ2 are applied to each of the light emission element chips CH001, CH002, . . . , CH056 in common. On the other hand, since the writing signal lines are connected respectively to the lines A, B and C of the light emission element chips, writing signal lines DATA<A>1, DATA<B>1 and DATA<C>1 are connected respectively to light emission element lines 001A, 001B and 001C in the chip CH001. Similarly, writing signal lines DATA<A>2, DATA<B>2 and DATA<C>2 are connected respectively to light emission element lines 002A, 002B and 002C in the chip CH002. By such a structure and the above-described operation of the light emission element chip, the light emission elements at the same address in the light emission element lines in the respective light emission element chips can perform light emission simultaneously. In this operation, ON/OFF controlling of light emission is performed according to the writing signals. It is apparent that such a structure, in which scanning functions of the self-scanning type light emission element chips having plural light emission element array lines are common for the respective light emission element arrays, can be realized in the above first to seventh embodiments of the present invention.

Figure 37:
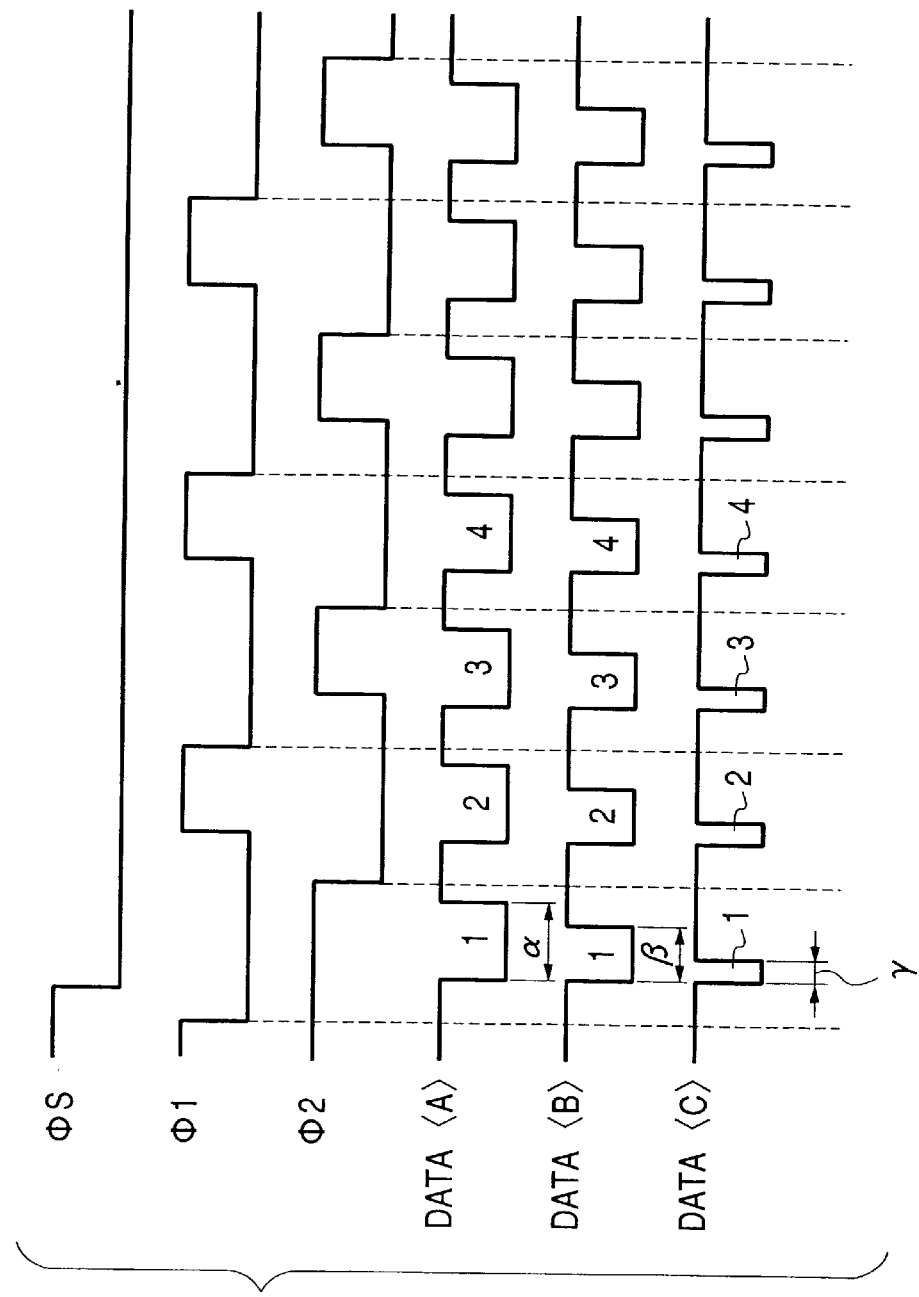
FIG. 37 is an operation waveform chart in a case where writing signals having different pulse widths are applied to each light emission element line, according to the eighth embodiment of the present invention.

Subsequently, an image formation method capable of increasing gradation or tonality in the exposure apparatus and the image formation apparatus using the exposure apparatus as a light source will be explained with reference to FIGS. 36 and 37.

As described above, FIG. 36 shows the time and pulse states of each signal in such a mode where the pulse widths of the writing signals applied to each light emission element line are substantially identical. On the other hand, FIG. 37 shows time and pulse states of each signal in such a mode where the pulse widths of the writing signals applied to each light emission element line are made different.

Since each signal and the light emission operation of each light emission element have been described as above, the explanation thereof is omitted. In FIG. 37, the pulse widths of the writing signals applied to each light emission element line are set to be different from others by a writing signal pulse width changing means (not shown), such that a ratio of the respective pulse widths can satisfy $\alpha:\beta:\gamma=4:2:1$.

Further, by controlling the rotational speed of the image support body 3802 shown in FIG. 40, it is set that the exposed surface of the image support body is moved by one light emission element line between first and second transfer operations, such that, after each light emission element line exposes the image support body in the first transfer operation, e.g., the light emission element line 001B overlappingly exposes the position already exposed by the light emission element line 001C (FIG. 34) in the second transfer operation. According to such a light emission based on the transfer operations and the driving of the image support body, the image exposed and visualized on the image support body can be obtained as the image formed by overlapping the luminous flux of the three light emission element lines. By such operations and pulse-width changing, the visualized image can have high gradation or tonality. That is, since $\alpha:\beta:\gamma=4:2:1$, "0" is obtained when each light emission element line is OFF, "1" is obtained when only the line C is ON, "2" is obtained when only the line B is ON, . . . . Thus, the gradation image having relatively eight levels, i.e., "0", "1", "2", "3", "4", "5", "6" and "7" levels can be visualized. The ratio of pulse widths may be changed according to characteristics based on the image to be formed, the image support body and the image formation apparatus itself.

On the other hand, in a mode where the pulse widths of the writing signals applied to each light emission element line are made substantially identical, as shown in FIG. 36, by controlling the rotational speed of the image support body 3802 shown in FIG. 40, it is set that the exposed surface of the image support body is moved by three light emission element lines between the first and second transfer operations so as not to overlap an exposure by the light emission elements, such that, after each light emission element line exposes the image support body in the first transfer operation, the position exposed by the light emission element line 001C (FIG. 34) in the second transfer operation is separated from the position exposed by the light emission element line 001A in the second transfer operation by a distance of the light emission element line. Thus, the case of forming a text image or the like for which gradation is not so necessary, high-speed image formation can be performed according to the number of light emission element lines provided in the light emission element chip.

In the present embodiment, a light emission element having therein three light emission element lines has been described by way of example. However, if two or more light emission element lines are used, the above effect in the present embodiment can be derived.

As described above, in the exposure apparatus according to the present embodiment, there are provided two modes, i.e., one mode to speedily form a latent image, effective for a no-gradation image such as a text image or the like, and the other mode to form a latent image for a high-gradation image. Thus, by applying such an exposure apparatus to an image formation apparatus, it becomes possible to output a high-quality image.

(Ninth Embodiment)

Hereinafter, the ninth embodiment of the present invention will be explained with reference to FIGS. 41 and 42.

In an exposure apparatus according to the present embodiment, an internal structure of a light emission element chip and a writing signal line are different from those in the eighth embodiment. Therefore, since operations and the like of an image formation apparatus in which an exposure apparatus according to the present embodiment is installed as a light source are substantially the same as those already explained in the eighth embodiment, the explanation thereof is omitted.

Hereinafter, a light emission element chip used in the present embodiment and its driving method will be explained.

Figure 41:
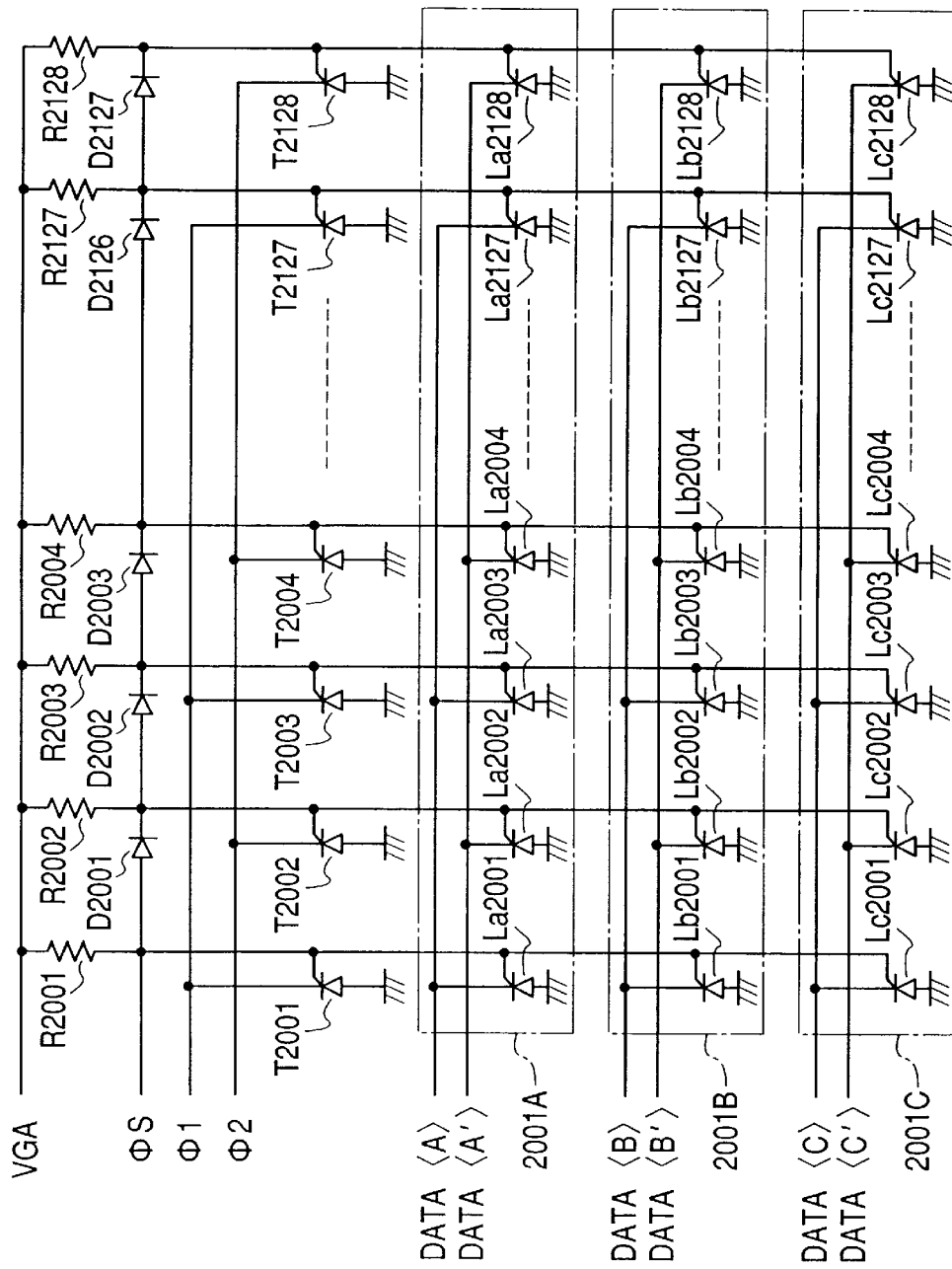
FIG. 41 is a view showing an equivalent circuit of a light emission element chip inside circuit according to a ninth embodiment of the present invention.

FIG. 41 is a view showing an equivalent circuit of a self-scanning type light emitter chip of thyristor structure according to the present embodiment.

Although FIG. 41 merely shows the inside structure of one light emission element chip, other light emission element chips have the same structure. Three light emission element lines 2001A, 2001B and 2001C are provided inside the light emission element chip, and each light emission element line has, e.g., 128 light emission thyristors. However, any number of thyristors equal to or larger than "2" may be used. In the drawing, symbols La2001, La2002, ..., La2128 denote light emission thyristors of the first light emission element line 2001A, symbols Lb2001, Lb2002, ..., Lb2128 denote light emission thyristors of the second light emission element line 2001B, and symbols Lc2001, Lc2002, ..., Lc2128 denote light emission thyristors of the third light emission element line 2001C. Further, symbols R2001, R2002, ..., R2128 denote load resistors, symbols D2001, D2002, ..., D2127 denote diodes, and symbols T2001, T2002, ..., T2128 denote switching elements each having a light emission thyristor. Symbol VGA denotes a power supply (line), symbol φS denotes a start pulse (line), and symbols DATA<A> and DATA<A'> denote writing signal lines through which writing signals are applied to the first light emission element line. The light emission thyristors are alternately connected to the writing signal lines, such that the light emission thyristors La2001, La2003, ..., La2127 are connected to the line DATA<A> and the light emission thyristors La2002, La2004, ..., La2128 are connected to the line DATA<A'>. Similarly, symbols DATA<B> and DATA<B'> denote writing signal lines through which the writing signals are applied to the second light emission element line, and symbols DATA<C> and DATA<C'> denote writing signal lines through which the writing signals are applied to the third light emission element line.

In this structure, for example, gate terminals of the switching elements T2001 and T2002 are connected to each other through the diode D2001, and also connected to the power supply VGA respectively through the load resistors R2001 and R2002. On the other hand, transfer clocks φ1 and φ2 for transfer operations are respectively applied to cathodes of the switching elements T2001 and T2002.

Subsequently, a light emission operation of the light emission element line will be explained. Here, a later-described case where pulse widths of the writing signals applied to the respective light emission elements are identical in each light emission element line will be explained by way of example.

Figure 42:
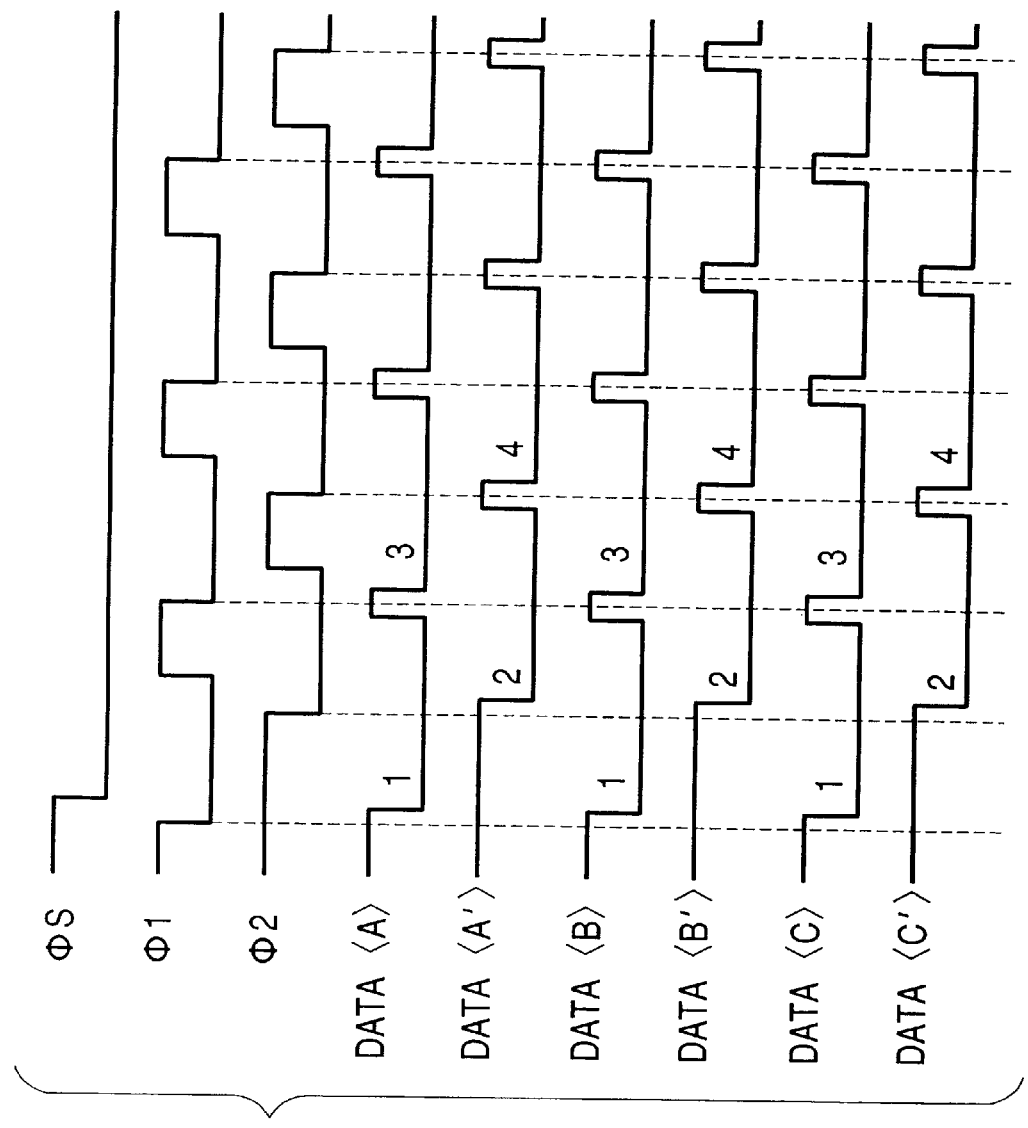
FIG. 42 is an operation waveform chart in a case where writing signals having an identical pulse width are applied to each light emission element line, according to the ninth embodiment of the present invention.

FIG. 42 shows time and pulse states of each signal in the case where the pulse widths of the writing signals applied to each light emission element line are substantially identical.

In FIG. 42, at a time t1, if it is assumed that one switching element T2001 is in an ON state based on the transfer clock φ1, its gate potential is substantially "0" volt. This potential has influence rightward through the diode D2001. Then, at a time t2, since Only the rightward elements are selectively turned on in response to the next clock φ2, it becomes possible to transfer the data rightward. When a data clock corresponding to image information is written simultaneously with addressing between the times t1 and t2 and the pulses representing "1" are applied to the data lines DATA<A>, DATA<B> and DATA<C> in FIG. 42, the corresponding light emission thyristors La2001, Lb2001 and Lc2001 perform light emission simultaneously. Further, the switching element T2002 is addressed between the times t2 and t3. Therefore, by applying the pulses representing "2" to the data lines DATA<A'>, DATA<B'> and DATA<C'> in FIG. 42, the corresponding light emission thyristors La2002, Lb2002 and Lc2002 can perform light emission. By repeating such operation, it is possible to cause the predetermined thyristors to perform light emission according to the image data. In addition, by providing the two signal writing lines for each light emission element line, it is possible to widen the pulse width of the writing signal larger for each light emission element. Namely, even at the instant that the initial writing signal "2" in the data line DATA<A'> of FIG. 42 is applied, the pulse of the writing signal in the data line DATA<A> is continuously in the ON state.

For this reason, since an amount of exposure on an image support body from each light emission element can be increased, when the exposure apparatus according to the present embodiment is used as the light source, a latent image can be formed at high speed. Thus, high-speed image formation by the image formation apparatus becomes possible.

In this case, a structure in which two writing signal lines are provided has been explained by way of example. However, if plural lines are used (>2), such an effect as above can be derived. In other words, as the number of writing signal lines increases, a time during which exposure can be overlapped increases. Thus, it is possible to increase the exposure amount.

Further, in the eighth embodiment, the pulse width of each writing signal line is made different for each light emission element line, or, for example, the pulse widths of the writing signals in the writing signal lines DATA<A> and DATA<A'> are made different from each other. Moreover, like in the eighth embodiment, by controlling the rotational speed of the image support body, it is set that the exposed surface of the image support body is moved by one light emission element line between the first and second transfer operations, such that, after each light emission element line exposes the image support body in the first transfer operation, the position already exposed by the light emission element line 2001C (FIG. 41) is again exposed by the light emission element line 2001B in the second transfer operation. Then, by repeating the above operations, the latent images can be overwritten by the light emission element lines, thereby visualizing a gradation image. In this case, the ratio of the pulse widths may be changed according to characteristics based on the image to be formed, the image support body and the image formation apparatus itself.

In the present embodiment, a structure in which a three writing signal lines are provided has been described by way of example. However, if plural lines equal to or larger than two lines are used, such an effect as above can be derived.

As described above, in the exposure apparatus according to the present embodiment, as compared with the eighth embodiment, higher-speed latent image formation can be achieved, and further, the latent image for a high-gradation image can be formed at higher speed. As a result, by applying the above exposure apparatus to the image formation apparatus, a high-quality image can be output.

(Tenth Embodiment)

Hereinafter, the tenth embodiment of the present invention will be explained with reference to FIG. 43.

An exposure apparatus in the present embodiment is different from that in the eighth embodiment in a point that a light emission amount changing means in each light emission element does not change a pulse width of a writing signal line but changes an area of a light emission part of the light emission element in each light emission element line to exposure a gradational (or tonal) image. Therefore, since an operation of an image formation apparatus in which the exposure apparatus according to the present embodiment is installed, a transfer operation of a light emission element chip and the like are substantially the same as those explained in the eighth and ninth embodiments, the explanation thereof is omitted.

FIG. 43 schematically shows a light emission element line on a light emission element chip. In the drawing, it should be noted that elements such as a transfer unit, a bonding pad and the like other than the light emission elements are omitted. Symbols CH3001, CH3002 and CH3003 denote light emission element chips, symbols La, Lb and Lc denote light emission elements in the respective light emission element lines at an edge of the chip CH3002, symbol P denotes a pitch in a direction along which the light emission elements are arranged, symbol d denotes a distance between the adjacent light emission element lines, and symbol δ denotes a distance between the adjacent light emission element chips.

The light emission element chips CH3001, CH3002, CH3003, . . . , are mounted on a light emission element chip mounting substrate. On the substrate (not shown), the distance δ has been adjusted such that the distance between the light emission elements at the edges of the opposite chips is equal to the pitch P. Further, a light emission part is formed such that a ratio of light emission amounts of the elements La, Lb and Lc can satisfy La:Lb:Lc=4:2:1. Like the case where a gradational image is formed in the eighth embodiment, an image support body is controlled such that the light emission element lines overlappingly perform exposure. Thus, like the eighth embodiment, a latent image can be formed for a image having eight-level gradations without changing the pulse width in the writing signal line. The ratio of areas of the light emission elements may be changed according to characteristics based on the image to be formed, the image support body and the image formation apparatus itself.

Further, like in the ninth embodiment, the exposure apparatus in which the plural writing signal lines are provided for each light emission element line may be provided to cause the light emission element lines to sequentially and overlappingly perform light emission, thereby increasing an exposure amount and thus realizing higher-speed latent image formation.

In the present embodiment, the structure in which the three light emission element lines are provided in the light emission element has been described by way of example. However, if plural lines equal to or larger than two lines are used, such an effect as above can be derived.

As described above, in the exposure apparatus according to the present embodiment, a gradational image can be exposed on the image support body without providing any pulse width changing means. Therefore, the image formation apparatus in which the exposure apparatus according to the present embodiment is used as a light source can form a higher-gradation image.

As described above, according to the present invention, in an exposure apparatus wherein the light emission elements are arranged in an array and in an image formation apparatus wherein such an exposure apparatus is used as the light source, a high-gradation and high-accuracy image can be provided.

Although the present invention has been explained based on several preferred embodiments, the present invention is not limited to these embodiments. That is, various changes and applications are possible within the scope of the appended claims.

What is claimed is:

1. An image formation apparatus comprising:
   plural light emission element arrays arranged substantially in parallel, an area of a light emission part of each array being different from others; and
   control means for controlling respective light emission elements in the light emission element arrays to selectively emit light in accordance with gradation data, so that respective light emission elements included in mutually different light emission element arrays overlappingly expose a same dot on a photosensitive body to form a gradation image on the photosensitive body.

2. An image formation apparatus according to claim 1, wherein one pixel is represented by plural exposure dots neighboring in an arrangement direction of the light emission elements.

3. An image formation apparatus according to claim 2, wherein one pixel is represented by plural exposure dots neighboring in a direction substantially perpendicular to the arrangement direction of the light emission elements.

4. An image formation apparatus comprising:
   plural switch elements arranged in an array and sequentially turned on;
   light emission element arrays of plural lines in which light emission elements respectively connected to the plural switch elements are arranged in an array, and which are arranged substantially in parallel, wherein, when the light emission elements are turned on by the corresponding switch elements, the plural light emission elements are scanned; and
   control means for controlling respective light emission elements included in mutually different light emission element arrays to selectively emit light in accordance with gradation data, such that respective light emission element arrays overlappingly expose a same dot on a photosensitive body to form a gradation image on the photosensitive body.

5. An image formation apparatus according to claim 4, wherein one pixel is represented by plural exposure dots neighboring in an arrangement direction of the light emission elements.

6. An image formation apparatus according to claim 4, wherein one pixel is represented by plural exposure dots neighboring in a direction substantially perpendicular to an arrangement direction of the light emission elements.

7. An image formation apparatus comprising:
   plural switch elements arranged in an array and sequentially turned on;
   light emission element arrays of plural lines in which light emission elements respectively connected to the plural switch elements are arranged in an array, and which are arranged substantially in parallel, wherein, when the light emission elements are turned on by corresponding switch elements and the plural light emission elements are scanned, an image is formed on a photosensitive body; and
   control means for controlling respective light emission elements included in mutually different light emitting element arrays to selectively emit light in accordance with gradation data, so that respective light emission elements included in the mutually different light emitting element arrays overlappingly expose a same dot on a photosensitive body to form a gradation image on the photosensitive body.

8. An image formation apparatus according to claim 7, wherein each of the plural light emission element arrays emits light in response to a pulse having a different width for each light emission element array.

9. An image formation apparatus according to claim 7, wherein an area of a light emission part of the light emission element array is different for each light emission element array.

10. An image formation apparatus according to claim 8, wherein said control means is operable in a first mode, in which said control means controls each of the plural light emission element arrays to emit light in response to a pulse having a different width for each light emission element array, and respective light emission element arrays overlappingly expose a photosensitive body to form a gradation image on the photosensitive body, and said control means is operable in a second mode, in which said control means controls the plural light emission element arrays to emit light in response to a same-width pulse, and respective light emission element arrays unoverlappingly expose the photosensitive body to form a non-gradation image on the photosensitive body.

11. An image formation apparatus according to claim 10, wherein a speed of the photosensitive body is varied in accordance with the operation mode.

12. An image formation apparatus comprising:

plural switch elements arranged in an array and sequentially turned on; and light emission element arrays of plural lines in which light emission elements respectively connected to the plural switch elements are arranged in an array, and which are arranged substantially in parallel, wherein, when the light emission elements are turned on by corresponding switch elements and the plural light emission elements are scanned, an image is formed on a photosensitive body; and control means for controlling each of the plural light emission element arrays to emit light in response to a pulse having a different width for each light emission element array, so that an exposure amount is different for each light emission element array, wherein said apparatus is operable in a first mode, in which, when each of the plural light emission element arrays is caused to perform light emission in response to a pulse having a different width for each light emission element array and the respective light emission element arrays overlappingly perform exposure on a photosensitive body, a gradation image is formed on the photosensitive body, and wherein said apparatus is operable in a second mode in which, when the plural light emission element arrays are caused to perform light emission in response to a same-width pulse and the respective light emission element arrays unoverlappingly perform exposure on the photosensitive body, a non-gradation image is formed on the photosensitive body.

13. An image formation apparatus according to claim 12, wherein a speed of the photosensitive body is varied in accordance with the operation mode.

* * * * *

UNITED STATES PATENT AND TRADEMARK OFFICE
CERTIFICATE OF CORRECTION

PATENT NO. : 6,184,971 B1  
DATED : February 6, 2001  
INVENTOR(S) : Izumi Narita et al.

Page 1 of 1

It is certified that error appears in the above-identified patent and that said Letters Patent is hereby corrected as shown below:

Column 9,  
Line 41, "sequential" should read -- sequentially --.

Column 10,  
Line 4, "used" should read -- used in --.

Column 14,  
Line 52, "an" (second occurrence) should read -- of an --.

Column 15,  
Line 4, "of" (first occurrence) should read -- of the --.

Column 18,  
Line 44, "the" (second occurrence) should read -- in the --.

Column 19,  
Line 66, "Only" should read -- only --.

Column 20,  
Line 36, "in" should read -- like in --.  
Line 56, "a" should be deleted.

Column 21,  
Line 31, "substrate." should read -- substrate (not shown). --; and (not shown) should be deleted.

Signed and Sealed this

Twenty-second Day of January, 2002

*Attest:*

*Attesting Officer*

JAMES E. ROGAN  
*Director of the United States Patent and Trademark Office*